US011539801B1

(12) United States Patent
Noskin et al.

(10) Patent No.: US 11,539,801 B1
(45) Date of Patent: Dec. 27, 2022

(54) SHARED AUGMENTED REALITY SESSIONS FOR RENDERING VIDEO EFFECTS

(71) Applicant: Lemon Inc., Grand Cayman (KY)

(72) Inventors: Dan Noskin, Culver City, CA (US); Mike Gubman, Los Angeles, CA (US); Yaxi Gao, Los Angeles, CA (US); Shengchuan Shi, Beijing (CN); Jie Liao, Los Angeles, CA (US); Yiling Chen, Los Angeles, CA (US); Chris Weigele, Culver City, CA (US); Esther An, Culver City, CA (US); Ryan Northway, Culver City, CA (US); Ray McClure, Los Angeles, CA (US); David Lewandowski, Culver City, CA (US); Keting Pan, Beijing (CN); Blake Fawley, Culver City, CA (US); Yi Chen, Beijing (CN); Yong Wang, Beijing (CN); Mehul Gore, Culver City, CA (US); Christine Lee, Culver City, CA (US); Vanessa Brown, Singapore (SG); Guangqian Tian, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/394,391

(22) Filed: Aug. 4, 2021

(51) Int. Cl.
*G06F 15/16* (2006.01)
*H04L 67/146* (2022.01)
(Continued)

(52) U.S. Cl.
CPC .......... *H04L 67/146* (2013.01); *G06T 19/006* (2013.01); *H04L 65/4015* (2013.01); *H04L 67/1095* (2013.01); *G06T 2219/024* (2013.01)

(58) Field of Classification Search
CPC ............... H04L 67/146; H04L 67/1095; H04L 65/4015; G06T 19/006; G06T 2219/024
(Continued)

(56) References Cited

U.S. PATENT DOCUMENTS 5,475,421 A * 12/1995 Palmer ............. H04N 21/42203
348/E7.083
5,594,859 A * 1/1997 Palmer ............. H04N 21/43074
715/756

(Continued)

OTHER PUBLICATIONS

Lego now has a multiplayer AR brick-building lens in Snapchat—CNET, https://www.cnet.com/tech/services-and-software/lego-now-has-a-multilayer-ar-brick-building-lens-in-snapchat/ retrieved Dec. 13, 2021, 7 pages.
(Continued)

*Primary Examiner* — Moustafa M Meky
(74) *Attorney, Agent, or Firm* — Faegre Drinker Biddle & Reath LLP

(57) ABSTRACT

Systems and methods for generating a video including a plurality of graphic objects provided in a shared environment is described. The method includes acquiring, at a first computing device, a shared session identifier from a shared session manager, the shared session identifier being associated with a first user identifier, receiving a selection of a second user identifier, causing the shared session identifier and the first user identifier to be provided to a second computing device associated with the second user identifier, receiving as input, a first graphic object for rendering to a display associated with the first computing device, the first graphic object being associated with the first user identifier, receiving from a data synchronizer, a second graphic object associated with the second user identifier and the shared
(Continued)

session identifier for rendering to the display associated with the second computing device, and generating a video including graphic objects.

20 Claims, 16 Drawing Sheets

(51) Int. Cl.
  *H04L 67/1095* (2022.01)
  *G06T 19/00* (2011.01)
  *H04L 65/401* (2022.01)
(58) Field of Classification Search
  USPC .......................................................... 709/227
  See application file for complete search history.

(56) References Cited

U.S. PATENT DOCUMENTS

| | | | |
|---|---|---|---|
| 8,613,620 B2 * | 12/2013 | Barasch | G09B 19/0038 |
| | | | 434/257 |
| 9,100,200 B2 * | 8/2015 | Nerst | H04L 12/1827 |
| 10,298,882 B1 * | 5/2019 | Galloway | G06F 9/44526 |
| 10,979,481 B2 * | 4/2021 | Jayaweera | H04L 12/18 |
| 11,394,757 B2 * | 7/2022 | Takahashi | G06F 3/0481 |
| 11,416,202 B2 * | 8/2022 | Hinohara | H04L 12/1822 |
| 2018/0121214 A1 * | 5/2018 | Faulkner | H04L 12/1822 |
| 2019/0075065 A1 * | 3/2019 | Arastafar | H04L 67/535 |
| 2020/0045264 A1 * | 2/2020 | Galloway | H04N 7/15 |
| 2021/0044645 A1 * | 2/2021 | Jayaweera | H04L 65/80 |
| 2021/0092170 A1 * | 3/2021 | Takahashi | G06F 3/1462 |

OTHER PUBLICATIONS

Gartenberg, Chaim, et al., "Snapchat gets augmented reality Legos you can build with a friend" The Verge, May 20, 2021.
Brew, Jeannine, "Verizon and Snap Inc. debut first-ever 5G Landmarker Lens," Nov. 17, 2020 Products & Plans/Home & Entertainment, News Center-Verizon works Blog.
Spark AR Team "Spark AR Previews Multipeer API for Video Calling," https://sparkar.facebook.com/blog/spark-ar-previews-multipeer-api-for-ar-video-calling/ Jun. 2, 2021.

* cited by examiner

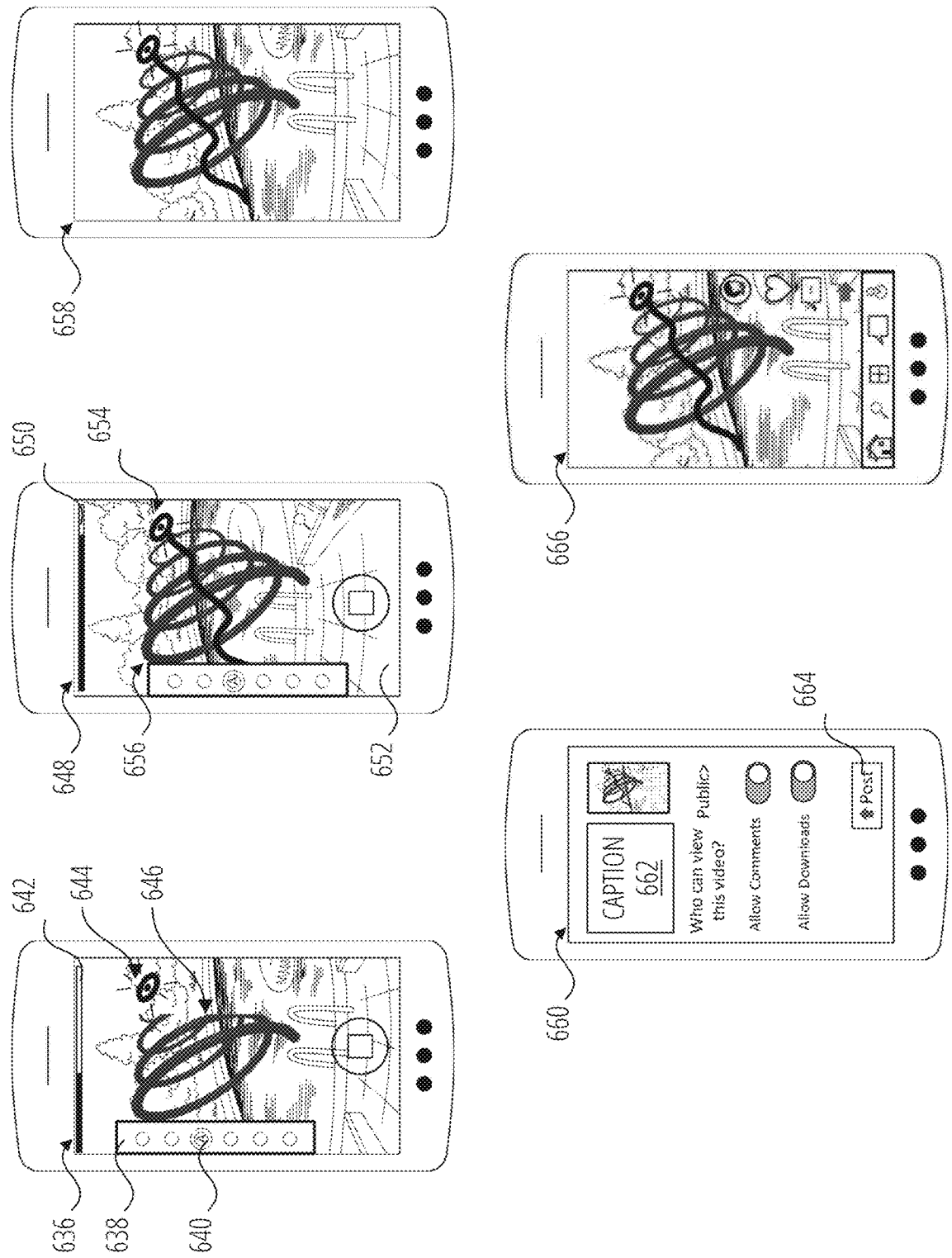

| SESSION_ID | VISUAL EFFECT_ID | USER_ID | GRAPHIC OBJECT_ID | TIME STAMP |
|---|---|---|---|---|
| ABEF43 | 1 | FRIEND 1 | OBJECT_A | X |
| ABEF43 | 2 | FRIEND 2 | OBJECT_B | X+Y |
| 23EF3D | m... | n... | OBJECT_C | Z |

SHARED AUGMENTED REALITY SESSIONS FOR RENDERING VIDEO EFFECTS

BACKGROUND

Video editing techniques are widely available to provide users various way to edit videos. For example, the users may edit a video to add a visual effect to the video. However, many of the video editing techniques do not account for shared real-time interactions between users adding video effects. Hence, there remains a need to develop video editing techniques for rendering a video effect to enhance the user experience.

It is with respect to these and other general considerations that the aspects disclosed herein have been described. Also, although relatively specific problems may be discussed, it should be understood that the examples should not be limited to solving the specific problems identified in the background or elsewhere in this disclosure.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Systems and methods for generating a video including a plurality of graphic objects provided in a shared environment is described. In accordance with at least one aspect of the present disclosure, a method includes acquiring, at a first computing device associated with a first user identifier, a shared session identifier from a shared session manager, the shared session identifier being associated with the first user identifier; receiving a selection of a second user identifier; causing the shared session identifier and the first user identifier to be provided to a second computing device associated with the second user identifier; receiving as input, a first graphic object for rendering to a display of the first computing device, the first graphic object being associated with the first user identifier; receiving from a data synchronizer, a second graphic object associated with the second user identifier and the shared session identifier for rendering to the display of the first computing device; and generating a video including a plurality of graphic objects by rendering the first graphic object and the second graphic object together with a plurality of video frames of the video.

In accordance with at least one aspect of the present disclosure, a computing device comprising a processor; and a memory are described. The memory may store instructions that, when executed by the processor, configure the computing device to: acquire a shared session identifier from a shared session manager, the shared session identifier being associated with a first user identifier; receive a selection of a second user identifier; cause the shared session identifier and the first user identifier to be provided to a shared augmented reality session processor; receive as input, a first graphic object for rendering to a display associated with the computing device, the first graphic object being associated with the first user identifier; receive from a data synchronizer, a second graphic object associated with the second user identifier and the shared session identifier for rendering to the display associated with the computing device; and generate a video including a plurality of graphic objects by rendering the first graphic object and the second graphic object together with a plurality of video frames of the video.

In accordance with at least one aspect of the present disclosure, a non-transitory computer-readable storage medium is described. The computer-readable storage medium may include instructions that when executed by a first computing device, cause the first computing device to: acquire a shared session identifier from a shared session manager, the shared session identifier being associated with a first user identifier; receive a selection of a second user identifier; cause the shared session identifier and the first user identifier to be provided to a second computing device associated with the second user identifier; receive as input, a first graphic object for rendering to a display associated with the first computing device, the first graphic object being associated with the first user identifier; receive from a data synchronizer, a second graphic object associated with the second user identifier and the shared session identifier for rendering to the display associated with the first computing device; and generate a video including a plurality of graphic objects by rendering the first graphic object and the second graphic object together with a plurality of video frames of the video.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

BRIEF DESCRIPTION OF THE DRAWINGS

To easily identify the discussion of any particular element or act, the most significant digit or digits in a reference number refer to the figure number in which that element is first introduced.

FIG. 6B depicts example user interfaces of a computing device in accordance with examples of the present disclosure.

FIG. 7 depicts details of an example data structure in accordance with examples of the present disclosure.

DETAILED DESCRIPTION

Figure 1:
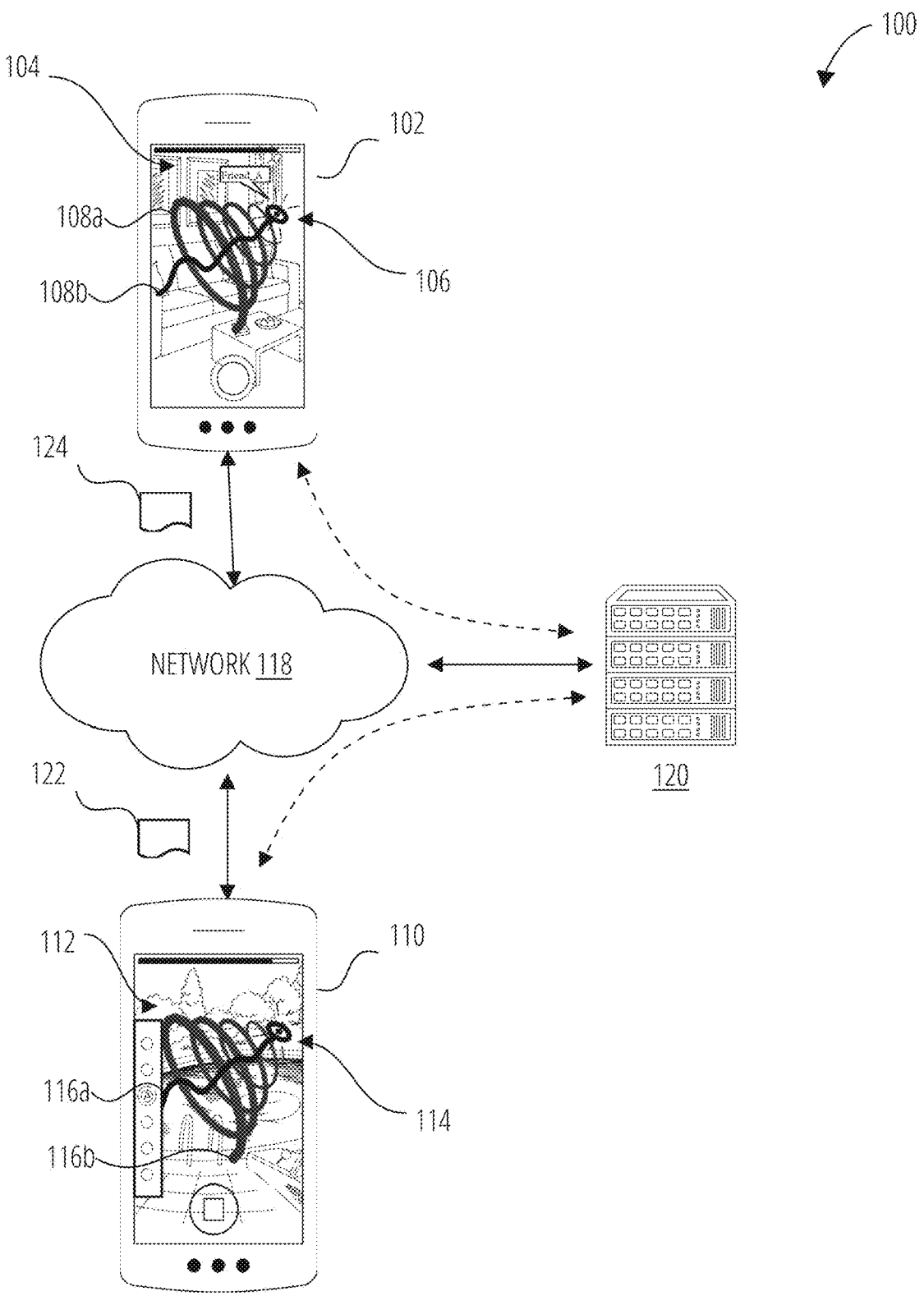
FIG. 1 depicts a shared augmented reality system in accordance with examples of the present disclosure.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, a shared augmented reality system is described that allows a first user, or participant, and a second user, or second participant, to together add one or more visual effects to respective videos. For example, a first user may use a first mobile computing device to initiate a shared augmented reality session. The shared augmented reality session allows for the first user and the second user to share or otherwise edit a video to add and/or edit video effects of respective videos in real-time. In examples, the video effects may include graphic objects, text objects, animations, or other visual effects. In some examples, the videos may be acquired in real-time as one or more visual effects provided by the first user and/or the second user are received and displayed over, on top off, or otherwise with the respectively acquired video. Alternatively, or in addition, the videos may be selected from a video library and the one or more visual effects provided by the first user and/or the second user can be applied to the respective videos as the videos are played and the one or more visual effects are received. In examples, the availability of a visual effect may depend on a property or attribute associated with a user identifier, device identifier, and combinations thereof. It should be appreciated that the shared augmented reality system may allow a single user to add visual effects to a video; in other examples, the shared augmented reality system may allow a plurality users to participate in a shared augmented reality session, where each participant can edit a video and add and/or edit a visual effect of a respective video. In particularly, each participant can edit visual effects on his/her own video; thus, each participant's video has the same visual effects.

In examples, the visual effects may be synchronized across each of the user's or participant's devices. That is, the shared augmented reality session may allow visual effects created by each of the participants to be synchronized across each session instance, where a session instance is locally generated for each participant and visual effects added during the session instance are synchronized to other session instances of other users or participants. Accordingly, videos of different scenes may be acquired or otherwise utilized by each of the different participants; however, the video effects may be synchronized or otherwise be the same for each participant. Of course, it should be understood that the synchronization of visual effects may be a one-way synchronization and may depend on a participant or user identifier for instance. Alternatively, or in addition, as previously discussed, the synchronization of visual effects occurs in both directions and for all participants.

In examples, a session manager, residing at a device, such as a user device or server, and accessible to user devices may maintain shared augmented reality session information and provide visual effects created or otherwise added by other shared augmented reality session participants to each of the session instances local to each device. The visual effects may be logged or otherwise maintained in a data structure at the session manager. That is, the session manager may create a shared augmented reality session and provide a session identifier to each user identifier invited by an initiating user. Accordingly, upon accepting the invitation by a user, a session instance that is local to that user may be initiated, where the session instance is associated with the session identifier provided by the session manager. As a user creates a visual effect or graphic object, such as a drawing, the drawing is displayed at a display and also transmitted to the session manager in real-time. In some examples, only changes, or a delta, between a previous drawing and the current drawing is sent to the session manager. In other instances, a graphic object associated with a visual effect is transmitted to the session manager. Alternatively, or in addition, and in accordance with a predetermined amount of time, the drawing and or changes associated with the drawing may be sent to the session manager. The session manager may transmit or otherwise provide the drawing changes to other local session instances associated with the session identifier. In examples, an application executing at user device may pull synchronization information; alternatively, or in addition, the session manager may push synchronization information to a user device. Accordingly, visual effects, such as graphics, text, objects, drawings, etc. may be synchronized across devices as each device is acquiring or playing video in real-time. Thus, once an augmented reality session concludes, one or more users may share or otherwise post a resulting video to a video hosting platform, where each of the resulting videos may include the same visual effects but depict different scenes.

FIG. 1 depicts a shared augmented reality system 100 in accordance with examples of the present disclosure. The shared augmented reality system 100 may include a computing device 102 associated with a first user and a computing device 110 associated with a second user. The computing device 102 may display a video scene 104 and allow a user to add one or more graphic objects to the video scene 104. Similarly, the computing device 110 may display a video scene 112 that is different from the video scene 104. The computing device 110 may allow a user to add one or more graphic objects to the computing device 110. In examples, the video scene 104 and the video scene 112 may refer to video that is acquired by each of the computing device 102 and 110 respectively. In some examples, the video scene 104 and/or video scene 112 may be associated with video acquired in real-time or may be associated with a previously acquired video clip for example, that user may play or otherwise view.

In examples, the computing device 102 may request a new session as part of session/synchronization data 124. The new session request may be transmitted to the cloud processing environment 120 via the network 118, where the cloud processing environment 120 may include a shared session manager. The shared session manager of the cloud processing environment 120 may provide a session identifier to the computing device 102. A user associated with the computing device 102 may select a user, e.g., contact or friend from a contact list, and cause the session identifier to be provided to a user identifier associated with the selected user. For example, the computing device 102 may transmit an invitation as session/synchronization data 124; the invitation may be provided directly to the computing device 110 for example, via the network 118, or the invitation may be provided to the cloud processing environment 120 which may then locate a network address of a device, such as computing device 110, associated with the selected user and transmit the invitation to the computing device 110. The selected user, or second user, may accept the invitation.

In examples, graphic objects created by a user associated with the computing device 102 during a shared augmented reality session may be transmitted to the cloud processing environment 120. Such graphic objects may then be transmitted to the computing device 110. Similarly, graphic objects created by a user associated with the computing device 110 during the shared augmented reality session may be transmitted to the cloud processing environment 120. Such graphic objects may then be transmitted to the computing device 102. Accordingly, the graphic objects created during the shared augmented reality system may be synchronized across local session instances at each of the computing device 102 and computing device 110. For example, one or more graphic objects 108b, 108a, 116a, 116b may create a visual effect 106 and a visual effect 114, where the visual effect 106 may be the same as or similar to the visual effect 114. In some examples, the visual effect 106 may differ from the visual effect 114 by using different colors or modifying other attributes for graphic objects not created at the local session instance. For example, graphic objects 108a and 108b created at the computing device 102 may appear as a different color than graphic objects 116a and 116b created at the computing device 110. Similarly, graphic objects 116a and 116b created at the computing device 110 may appear as a different color than graphic objects 108a and 108b created at the computing device 102.

The computing device 102 and computing device 110 may be any one of a portable or non-portable computing device. For example, the computing device 102 and/or computing device 110 may include a smartphone, a laptop, a desktop, a server, an electrical wearable device, or one or more smart home devices, etc. An acquired video, or video clip of the video scene 104 and/or video scene 112 may be acquired in any format and may be in a compressed and/or decompressed form. The network 118 may include any kind of computing network including, without limitation, a wired or wireless local area network (LAN), a wired or wireless wide area network (WAN), and/or the Internet. The cloud processing environment 120 may correspond to a hosted processing environment and may facilitate a shared augmented reality session between multiple computing devices. In some examples, the cloud processing environment 120 may allow a user to post one or more generated videos such that the posted videos are accessible by others.

Figure 2:
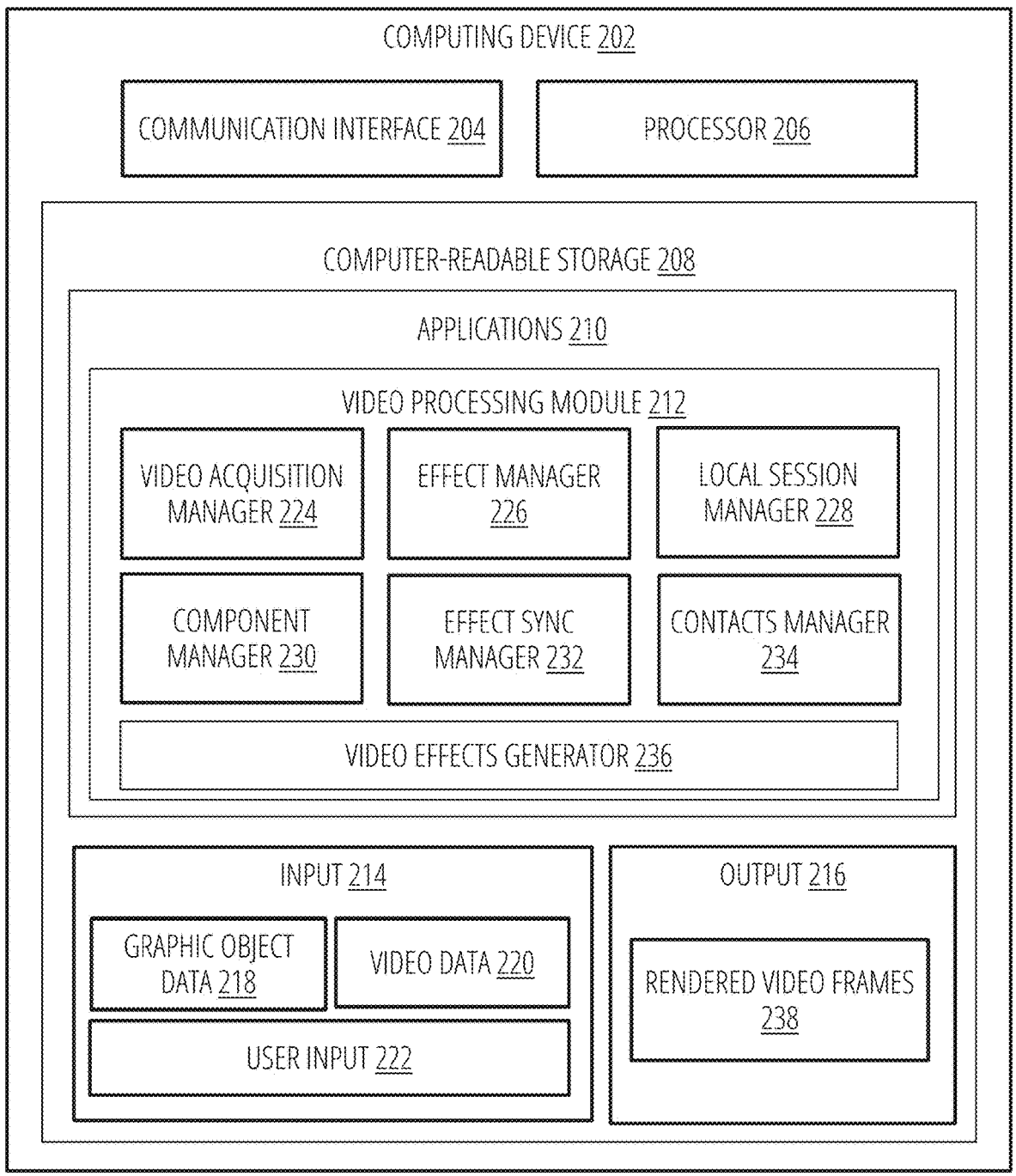
FIG. 2 depicts additional details of a computing device in accordance with examples of the present disclosure.

Referring now to FIG. 2, additional details of the computing device 102 and/or computing device 110 are described as the computing device 202 in accordance with examples of the present disclosure. The computing device 202 may be the same as or similar to the computing device 102 and/or computing device 110 as previously described in FIG. 1. The computing device 202 may include a communication interface 204, a processor 206, and a computer-readable storage 208. In examples, the communication interface 204 may be coupled to a network, such as network 118 (FIG. 1) and receive session/synchronization data and/or one or more graphic objects that are to be added to video. The one or more graphic objects may be received from a data synchronizer of a cloud processing environment. In examples, the one or more graphic objects may be stored as graphic object data 218.

In examples, one or more applications 210 may be provided by the computing device 202. The one or more applications 210 may include a video processing module 212. The video processing module 212 may include a video acquisition manager 224, an effect manager 226, a local session manager 228, a component manager 230, an effect sync manager 232, and/or a contacts manager 234. The video acquisition manager 224 is configured to receive, acquire, or otherwise obtain video data that includes one or more video frames. The acquired video data may be stored as video data 220. In examples, the effect manager 226 may manage how and when one or more graphic objects are applied to the video data 220. For example, the effect manager 226 may configure the video acquisition manager 224 to acquire video data and coordinate the receiving of user input 222 from a user of the computing device 202. That is, a user may start providing a graphic object or graphic data, such as a drawing or drawing data, once the effect manager 226 has initiated a local session for example. The effect manager 226 may communicate with the local session manager 228 to start a local session.

In examples, the local session may be initiated directly by the effect manager 226 or may be initiated upon the receipt of a session identifier. For example, where the computing device 202 receives an invitation to join a session, the local session manager 228 may initiate a session based on a session identifier of the session received from a cloud processing environment. In examples, the effect sync manager 232 may manage the local synchronization of graphic object data and provide graphic object data received from a user as user input 222 to the cloud processing environment. For example, a user may provide graphic object data 218 as an input 214. The graphic object data 218 may include information such as drawing data, paint brush data, pencil data, fill data, marker data, highlighter data, etc. and may represent specific location and type information associated with the graphic object. As an example, a user may choose to use a paintbrush tool and to provide input as drawing information. The drawing information may correspond to line stroke, width, start, stop, color, etc. The drawing information can be provided to the effect sync manager 232 where the effect sync manager 232 causes such data to be sent to the cloud processing environment. In examples, the effect sync manager 232 may associate a requested shared augmented reality session identifier with the session/synchronization data that is sent to the cloud processing environment 120.

Further, the effect sync manager 232 may receive drawing information from the cloud processing environment 120. For example, the communication interface 204 may receive session/synchronization data; the effect sync manager 232 may synchronize or otherwise cause graphic objects included in the session/synchronization data to be added to the local session. That is, the effect sync manager 232 may cause the session/synchronization data to be rendered to or otherwise presented as a graphic object in the local session. In some examples, the received session/synchronization data may be stored as graphic object data or otherwise presented as graphic object data. Accordingly, graphic object data included in the session/synchronization data may be displayed at a display of the computing device 202.

The component manager 230 is an example input tool manager that manages one type of input—such as paintbrush data. A paintbrush is a non-limiting example of one specific type of graphic object, though many others are contemplated. In some examples, one or more attributes associated with the graphic object may be managed by the manager, such as the brush manager. As previously described, the color, width, and other effects may be changed to obtain different graphic objects. In some examples, the availability of a graphic object, such as a component (e.g., paintbrush), attribute of the component, or specific component type may be controlled or otherwise enabled according to one or more parameters. For example, a parameter stored in a user profile or otherwise associated with a user may indicate that a component is available for use by the user. The component manager 230 for example, may manage the availability of the graphic object. It should be understood that the component manager 230 is for illustrative purposes, other visual effect managers can be also included in the video processing module 212 in accordance with the type of the visual effect.

The contacts manager 234 may manage or otherwise make available to a user one or more users, such as one or more contacts associated with a user identifier. For example, a user list such as a friends list that exists at the computing device 202 or is otherwise accessible at the computing device 202 may be associated with a user identifier for a user that uses the computing device 202. Thus, a user, desiring to setup a shared augmented reality session may cause one or more applications 210 to access the contacts manager 234 and present, for display to the user, a list of users, friends, or contacts to invite one or more users, friends, or contacts into the shared augmented reality session. The contacts manager 234 may include information to identify a user, friend, or contact by address, username, user identifier, etc. Accordingly, upon being selected, information associated with a user, friend, or contact may be included in an invitation and can be sent to the cloud processing environment, where an invitation manager in the cloud processing environment may deliver the invitation to the invited user, friend, or contact.

Upon accepting the invitation, a shared session manager of the cloud processing environment may provide a shared augmented reality session identifier to the computing device 202 such that a local session manager 228 of the computing device may generate a local session and associate the local session with the shared augmented reality session identifier. Alternatively, or in addition, the session/synchronization data may include a shared augmented reality session identifier such that the local session manager 228 of the computing device generates a local session and associates the local session with the shared augmented reality session identifier provided in the session/synchronization data or invitation. Accordingly, the graphic object data created by another local session, or another computing device associated with the local session, may be provided to a data synchronizer in a cloud processing environment. The data synchronizer in the cloud processing environment may provide session/synchronization data to the effect sync manager 232. The video effects generator 236 may utilize the graphic object data from the data synchronizer in the cloud processing environment as well as the graphic object data from the effect manager to generate a graphic effect. The visual effect 114 (FIG. 1) may include graphic objects from the computing device 202 as well as from a remote computing device. In examples, the video effects generator 236 may generate rendered video frames 238 and store the rendered video frames 238 as output 216. That is, the rendered video frames 238 may include the visual effect 106 and/or 112.

Figure 3:
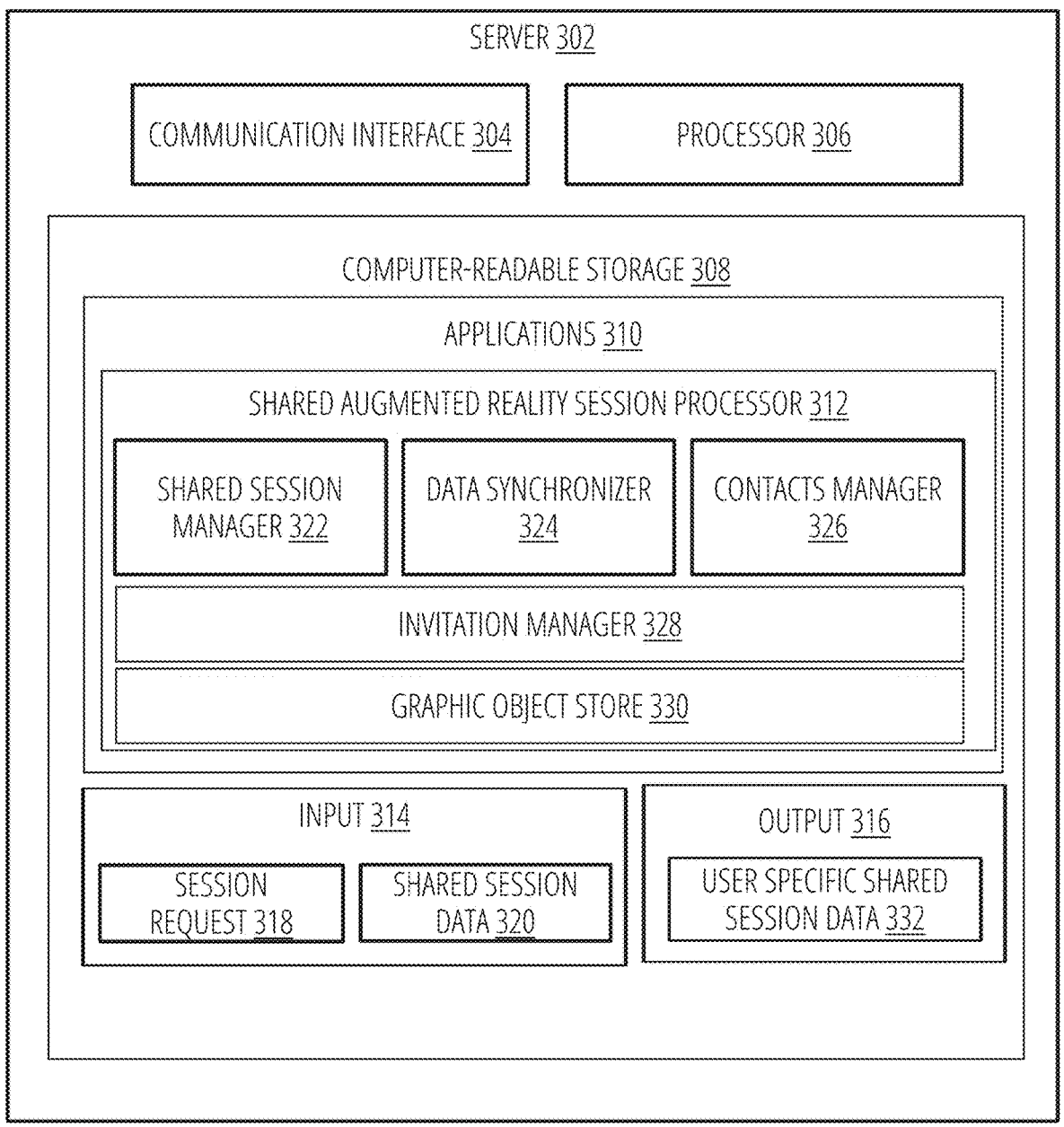
FIG. 3 depicts additional details of a server in a cloud processing environment in accordance with examples of the present disclosure.

Referring now to FIG. 3, additional details of a server 302 in a cloud processing environment are described in accordance with examples of the present disclosure. The server 302 may be part of the cloud processing environment as previously described in FIG. 1. The server 302 may include a communication interface 304, processor 306, and a computer-readable storage 308. In examples, the communication interface 304 may be coupled to a network, such as network 118 (FIG. 1) and receive session/synchronization data that may include one or more graphic objects that are to be synchronized to one or more user devices. The session/synchronization data may be received and stored as an input 314.

In examples, one or more applications 310 may be provided by the server 302. The one or more applications 310 may include a shared augmented reality session processor 312. The shared augmented reality session processor 312 may include a shared session manager 322, a data synchronizer 324, a contacts manager 326, an invitation manager 328, and a graphic object store 330. The shared augmented reality session processor 312 is configured to manage a shared augmented reality session. That is, the shared session manager 322 may receive a session request 318 from a computing device, such as the computing device 202. The session request 318 may correspond to a request to setup or otherwise configure a shared augmented reality session. Accordingly, the shared session manager 322 may generate a shared augmented reality session identifier and send the shared augmented reality session identifier as session/synchronization data to the requesting computing device. Accordingly, the requesting computing device may initiate a local session and associate the local session with the shared augmented reality session identifier provided by the shared session manager 322.

In addition to creating or otherwise initiating a shared augmented reality session, the shared session manager 322 may also manage cleanup operations such as closing down a shared augmented reality session when it is no longer being used. Further, the shared session manager 322 may cooperate with the invitation manager 328 to invite other users and/or computing devices to the shared augmented reality session. That is, a request from a computing device may include a request to send an invitation to a user or computing device associated with a user. The invitation manager 328 may send the invite to the user that has been invited. For example, the invitation manager 328 may send an invitation to a computing device such that the computing device can join the shared augmented reality session.

Alternatively, or in addition, the shared session manager 322 may allow access to a shared augmented reality session based on a user providing the shared augmented reality session identifier. For example, the shared session manager 322 may generate a shared augmented reality session identifier that can be entered into an application; upon entering the shared augmented reality session identifier, a local session may be initiated at the computing device and associated with the shared augmented reality session identifier.

In examples, the session/synchronization data may be received by the communication interface 304 as shared session data 320. In some examples, the shared session data 320 may include graphic object data such as but not limited to drawing objects, text, and/or other visual indicia that may be displayed at a display device of a computing device. In some examples, the graphic object data may not persist at the server 302. In other examples, the graphic object data may be stored at the graphic object store 330 such that a later joining user may have access to graphic effects that were created prior to the user joining a shared augmented reality session.

The data synchronizer 324 may receive shared session data 320 and determine which computing device or which user identifier associated with a computing device to send such data. For example, graphic object data received from one computing device may be synchronized with another computing device, where both computing devices are participants in a same shared augmented reality session as determined by the shared augmented reality session identifier. Accordingly, the data synchronizer 324 may provide the graphic object data as user specific shared session data 332; the user specific shared session data 332 may be sent to the identified users/computing devices as identified by the data synchronizer 324. Such information can be sent as session/synchronization data and as output 316.

Figure 4A:
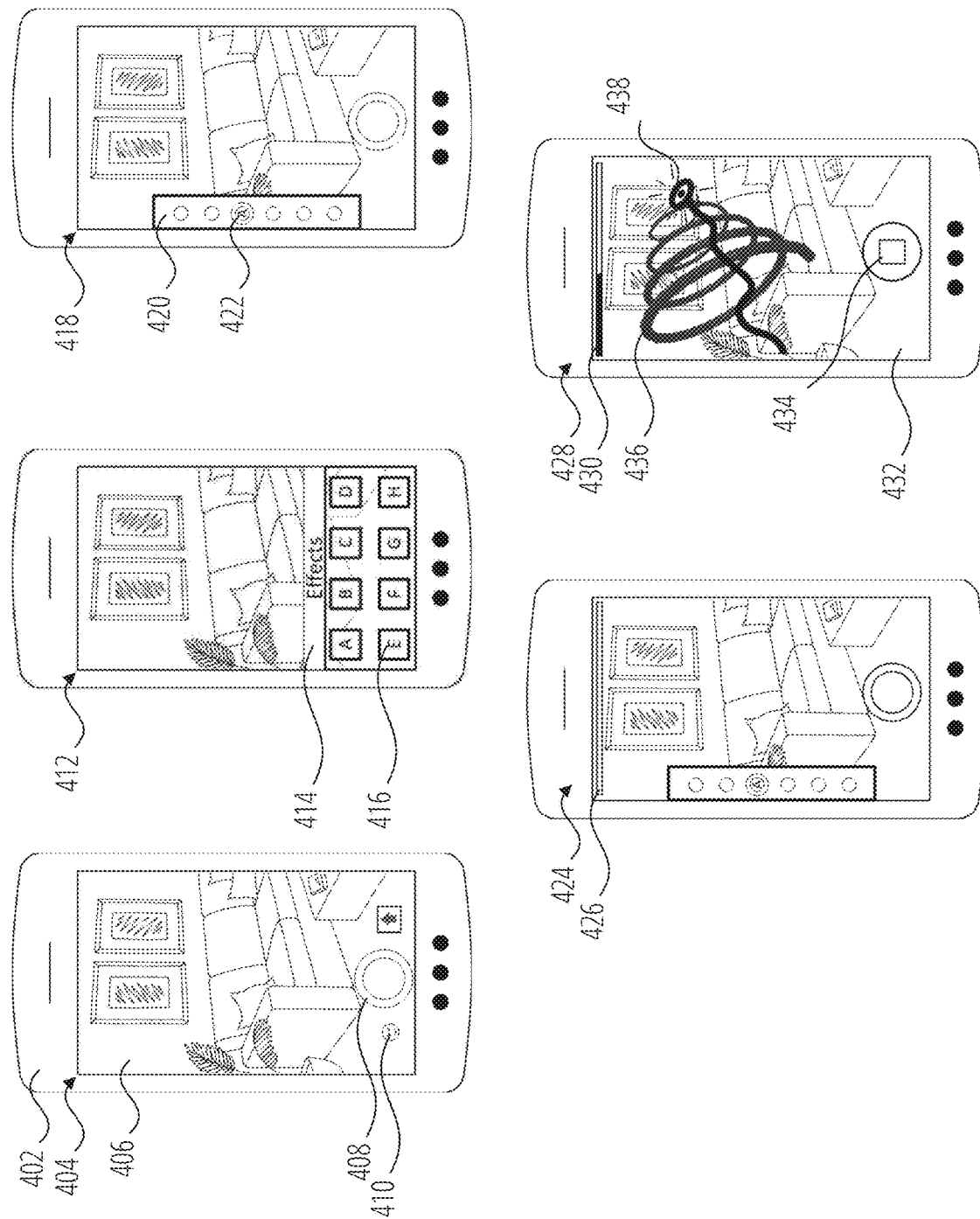
FIG. 4A depicts example user interfaces of a computing device in accordance with examples of the present disclosure.
Figure 4B:
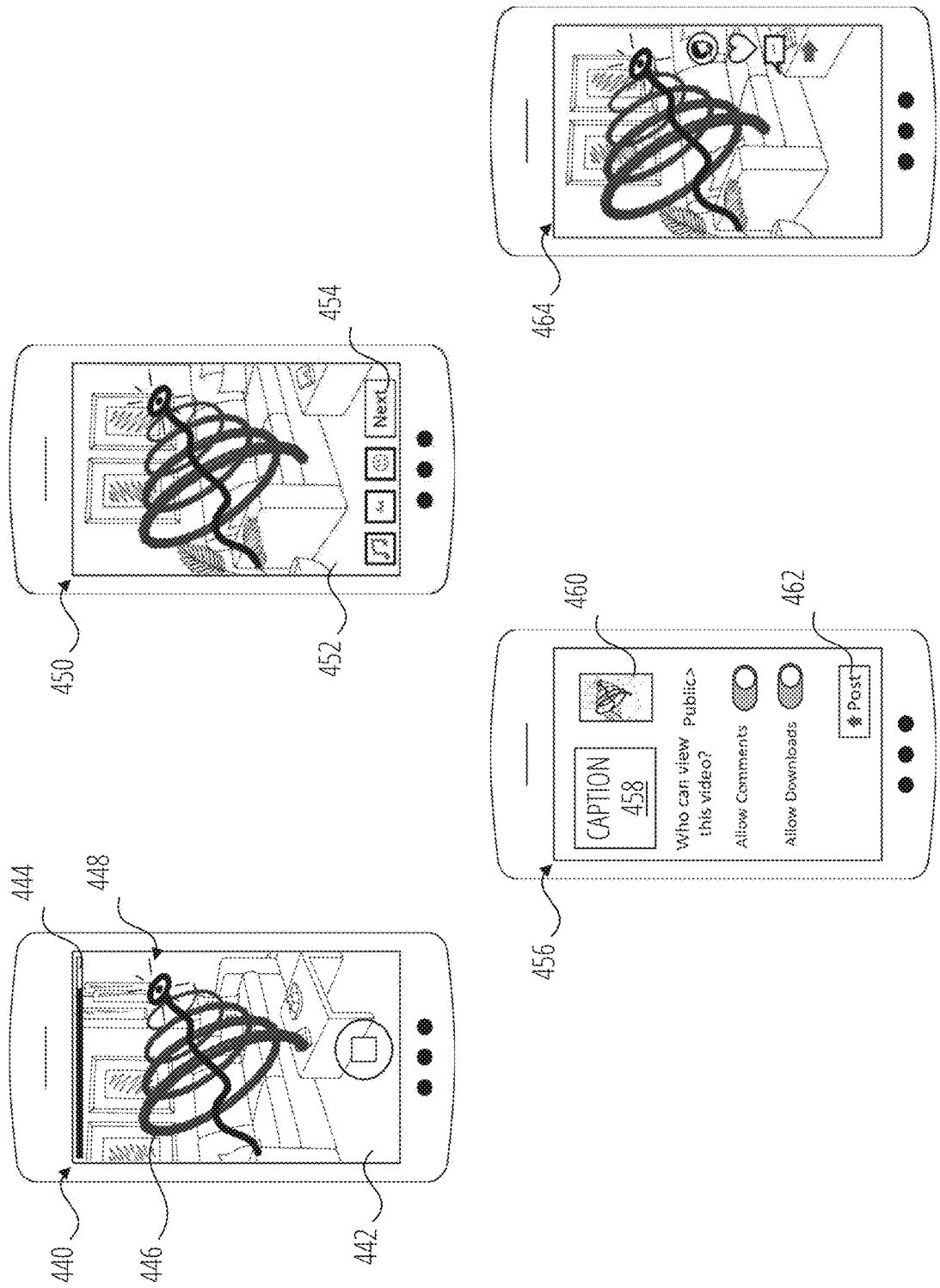
FIG. 4B depicts example user interfaces of a computing device in accordance with examples of the present disclosure.

FIGS. 4A-4B depict example user interfaces of a computing device in accordance with examples of the present disclosure. The various user interfaces presented in FIGS. 4A-4B depict an example of an augmented reality session that is not shared. In examples, the user interfaces presented in FIGS. 4A-4B depict examples where such an augmented reality session can be used by a single user. A first user interface 404 is displayed at a computing device 402 in accordance with examples of the present disclosure. The first user interface 404 may include a background scene 406 of a video. In examples, the background scene 406 may be presented or otherwise displayed in a manner similar to a view finder of a camera. That is, a camera of a computing device 402 that is associated with the display of the computing device 402 may acquire an image and display the image at the display. As the computing device 402, and thus the camera move, the background scene 406 may change. In addition, the first user interface 404 displays a record control 408. The record control 408 may allow a user associated with the computing device 402 to record video together with one or more graphic effects that are created as the video is recorded and/or as another video is played.

In examples, a user may select an effect control 410 that is displayed at the first user interface 404. The effect control 410 may cause an effects panel 414 to be displayed at the computing device 402, as depicted in the second user interface 412. The effects panel 414 may include a plurality of different effects that are available to a user of the computing device 402. In examples, at least one effect includes a shared augmented reality session. Thus, the user may select a selected effect 416 causing the third user interface 418 to be displayed at the computing device 402. The third user interface 418 may include an effect palette 420 that includes a plurality of effect tools. For example, an effect tool may correspond to a drawing tool, a painting tool, and/or another tool that creates or causes a visual effect to be displayed at the user interface. It should be understood that the effect palette 420 is for illustrative purposes, and the effect palette 420 may not be included for each of the selected visual effects. A user may select an effect tool 422, such as a paintbrush, pen, pencil, etc.

Once a user has selected an effect tool 422, a video sequence record progress bar 426 may be displayed as depicted in the fourth user interface 424. The video sequence record progress bar 426 provides a visual indication of an amount of remaining video to be captured. For example, a user may desire to capture a video clip, where the video clip is 15 seconds, 30 seconds, 45 seconds, or 60 seconds long. As depicted in the fifth user interface 428, a user may select the record control 434 and cause the computing device 402 to start acquiring video of the background scene 432. In examples, using the selected effect and/or selected effect tool, such as but not limited to a drawing tool, a user may draw a first visual effect 436 and/or a second visual effect 438, where the first visual effect 436 and/or second visual effect 438 may be associated with one or more video frames that are being acquired by the computing device 402. As depicted in the fifth user interface 428, the video sequence record progress bar 430 provides an approximation of an amount of remaining time that is available for a user to record the background scene 432. In some examples, if the computing device 402 moves, the background scene 432 will be different than the background scene 406.

For example, as depicted in the sixth user interface 440, the background scene 442 is different than the background scene 432. Once a video has reached a desired length, the video sequence record progress bar 444 may indicate as much. In examples, the first visual effect 446 and the second visual effect 448 may be the same as or similar to the first visual effect 436 and/or second visual effect 438, respectively. At the conclusion of recording a video, the seventh user interface 450 may display an initial background scene 452 together with the one or more user effects. A user may interact with the seventh user interface 450 to edit the captured video. For example, the user may add text, music, emojis, etc. to the newly captured video. A user may select the next control 454.

At the eighth user interface 456, a user may select one or more configurations associated with the newly acquired video. For example, the user may decide to allow comments, determine who can view the newly acquired video, and/or determine whether individuals can download the video. In some examples, the user may provide a caption 458 for the video, where the caption 458 may include text describing the video. The eighth user interface 456 may also display a video thumbnail 460 associated with the newly acquired video. Upon selecting the post control 462, the newly acquired video can be posted to a video hosting platform, such as one hosted in the cloud processing environment, as illustrated in the ninth user interface 464.

Figure 5A:
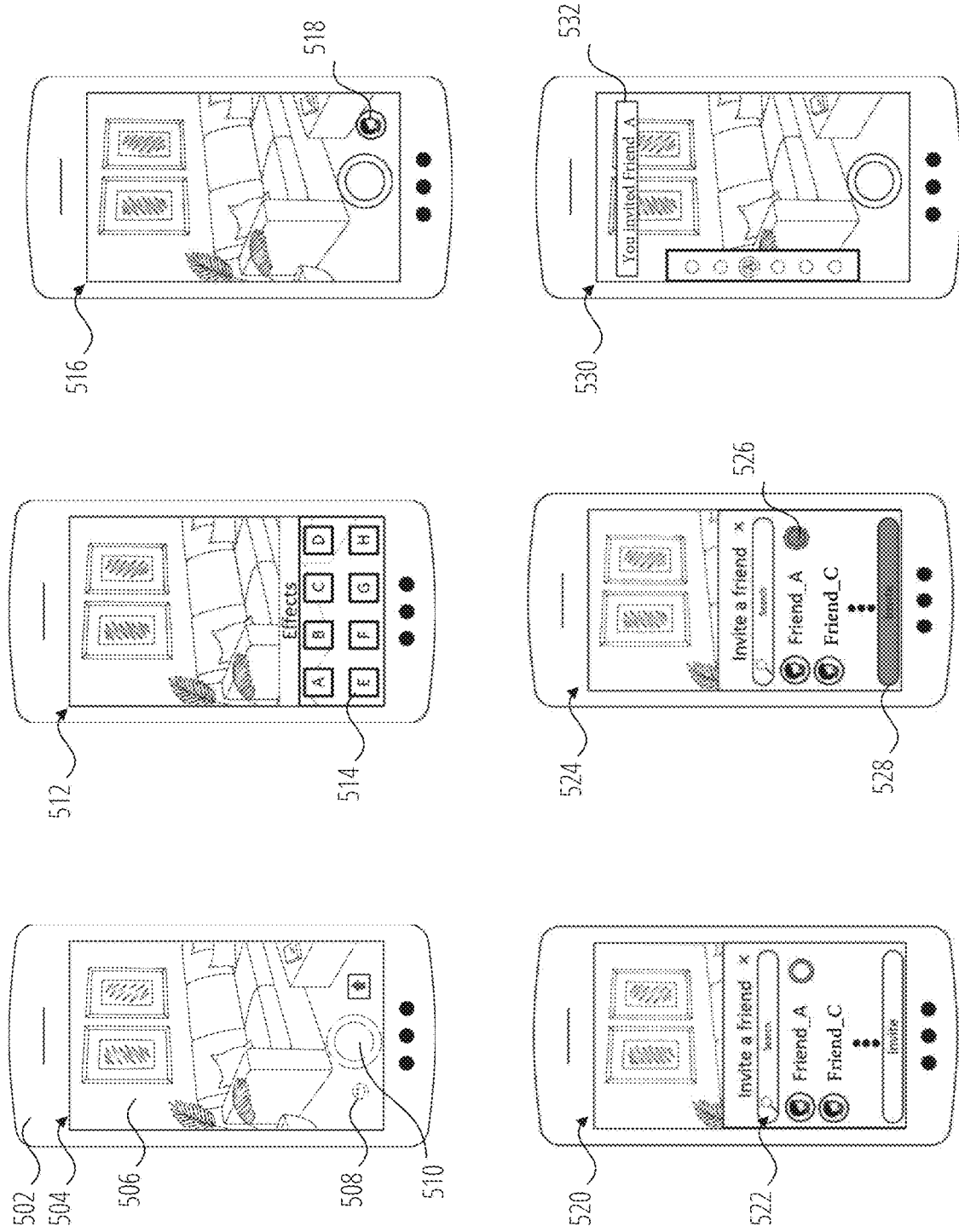
FIG. 5A depicts example user interfaces of a computing device in accordance with examples of the present disclosure.
Figure 5B:
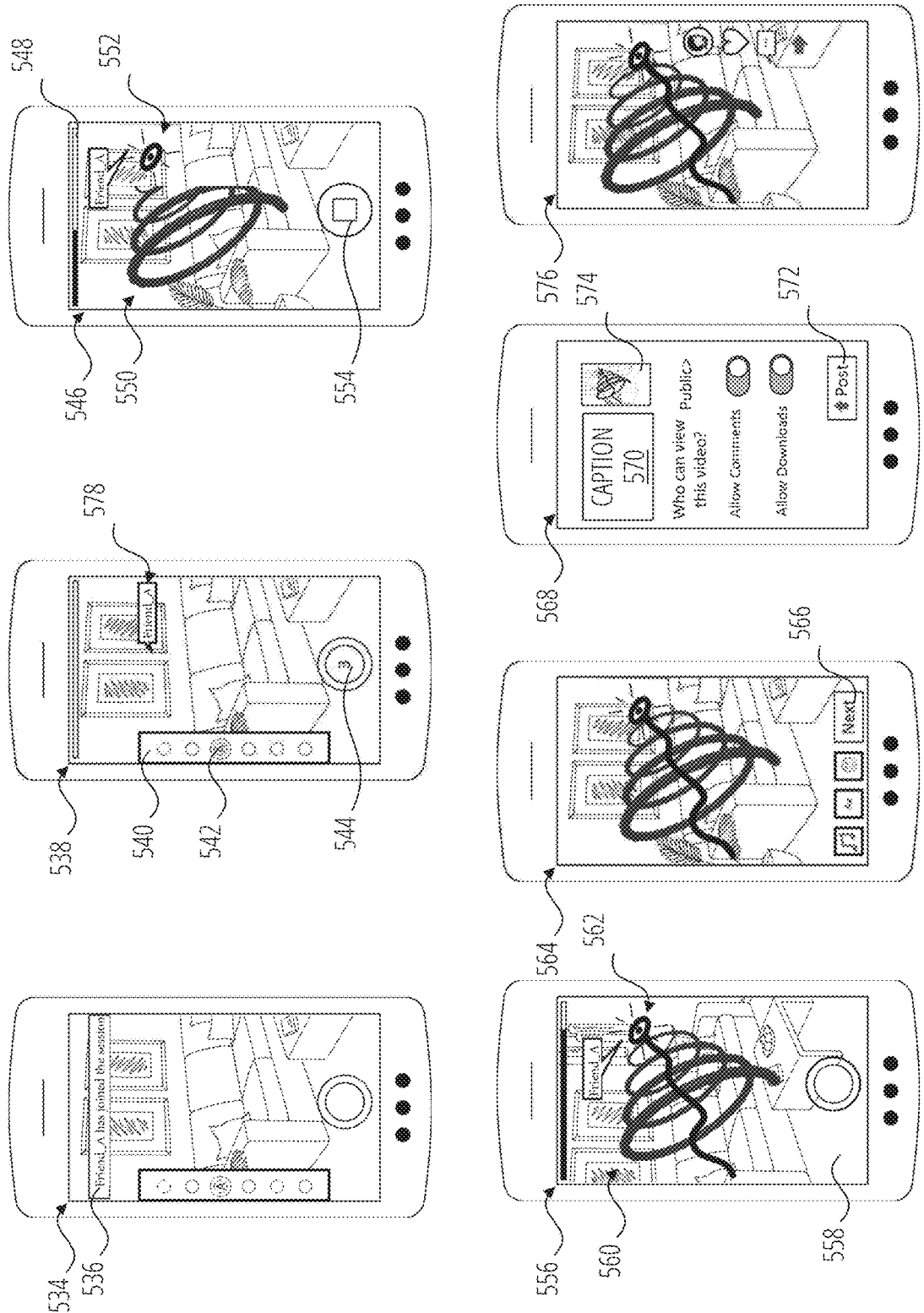
FIG. 5B depicts example user interfaces of a computing device in accordance with examples of the present disclosure.

FIGS. 5A-5B depict example user interfaces of a computing device in accordance with examples of the present disclosure. The various user interfaces presented in FIGS. 5A-5B depict an example of a shared augmented reality session. In examples, the user interfaces presented in FIGS. 5A-5B depict examples where such an augmented reality session can be used by more than one user and depict examples from a point of view of a user inviting another user to a shared augmented reality session. A first user interface 504 is displayed at a computing device 502 in accordance with examples of the present disclosure. The computing device 502 may be the same as or similar to the computing device 202 previously described. The first user interface 504 may include a background scene 506 of a video. In examples, the background scene 506 may be presented or otherwise displayed in a manner similar to a view finder of a camera. That is, a camera of a computing device 502 that is associated with the display of the computing device 502 may acquire an image and display the image at the display. As the computing device 502, and thus the camera move, the background scene 506 may change. In addition, the first user interface 504 displays a record control 510. The record control 510 may allow a user associated with the computing device 502 to record video together with one or more graphic effects that are created as the video is recorded, acquired, and/or as another video is played.

In examples, a user may select an effect control 508 that is displayed at the first user interface 504. The effect control 508 may cause an effect panel to be displayed at the computing device 502, as depicted in the second user interface 512. The effect panel may include a plurality of different effects that are available to a user of the computing device 502. In examples, at least one effect includes a shared augmented reality session. Thus, the user may select a selected effect 514 causing the third user interface 516 to be displayed at the computing device 502. At the third user interface 516, an invite friend control 518 is displayed. The invite friend control 518, upon selecting, initiates an invitation for another user to join a shared augmented reality session. The invite friend control 518 shown on user interface 516 is exemplary; that is, the invite friend control 518 may be represented with other types of icons and can be located on any proper area of the user interface 516. In examples, after selecting the invite friend control 518, an invite a friend interface 522 may be displayed, as depicted in the fourth user interface 520. The invite a friend interface 522 may display a list of friends and/or contacts for a user to select.

For example, a user may select a selected friend 526 displayed at the fifth user interface 524. Once chosen, the user may select the invite friend control object 528. Upon selecting the invite friend control object 528, the computing device 502 may send session/synchronization data to a cloud processing environment, where the session/synchronization data may include a request to invite the selected user. Proceeding to the sixth user interface 530, an invite indication 532 may be displayed to the user. The invite indication 532 may provide an indication to the user that they have invited a user to join the shared augmented reality session. As for invite a friend interface 522, the number of friends in the list are not limited to two and may include more than two, as indicated by the ellipses.

As depicted in FIG. 5B, after the invited user joins the shared augmented reality session, a seventh user interface 534 may provide a session status 536 or update to the user of the computing device 502. The eighth user interface 538 depicts an example user interface where a user may select the effect pallet 540, a selected effect tool 542, and then select a record control 544. In examples, the record control 544 may provide a countdown indication informing a user that recording will start in three seconds for example. In examples, an invited user cursor position 578 may display the cursor position of the invited user. For example, the invited user cursor position 578 may indicate where a finger, stylus, or other pointing device is located at a computing device of the invited user. As depicted in the ninth user interface 546, a record control 554 and video sequence record progress bar 548 indicates that recording is occurring. Further, a user may draw or otherwise place the current user visual effect 550, where the current user visual effect 550 is created by the user of the computing device 502 using the selected effect tool 542. As further depicted at the ninth user interface 546, a second user visual effect 552 is displayed. The second user visual effect 552 may be received by the computing device 502 as session/synchronization data, processed, and then displayed to the ninth user interface 546. In examples, an indication of a tooltip associated with the invited user may be displayed. For example, the tool tip may indicate a position of a cursor as directed by the invited user, also referred to as the second user, e.g., Friend_A. As further depicted in the ninth user interface 546, the current user visual effect 550 and the second user visual effect 552 may appear as incomplete visual effects, since both the user at the computing device 502 and the second user or invited user have not completed the visual effect.

As depicted the tenth user interface 556, the background scene 558 is different than the initial background scene 506. Once a video has reached a desired length, the video sequence record progress bar may indicate as much. In examples, a completed current user visual effect 560 and second user visual effect 562 are depicted, where the second user visual effect 562 depicts a visual effect provided by the invited user. At the conclusion of recording a video, an eleventh user interface 564 may display an initial background scene 506 together with the one or more user effects (e.g., current user visual effects 560, 562). A user may interact with the eleventh user interface 564 to edit the captured video. For example, the user may add text, music, emojis, etc. to the newly captured video. A user may select the next control 566.

At the twelfth user interface 568, a user may select one or more configurations associated with the newly acquired video. For example, the user may decide to allow comments, determine who can view the newly acquired video, and/or determine whether individuals can download the video. In some examples, the user may provide a caption 570 for the video. The twelfth user interface 568 may also display a video thumbnail 574 associated with the newly acquired video. Upon selecting the post control 572, the newly acquired video can be posted to a video hosting platform, such as one hosted in the cloud processing environment, as illustrated in the ninth user interface 576.

Figure 6A:
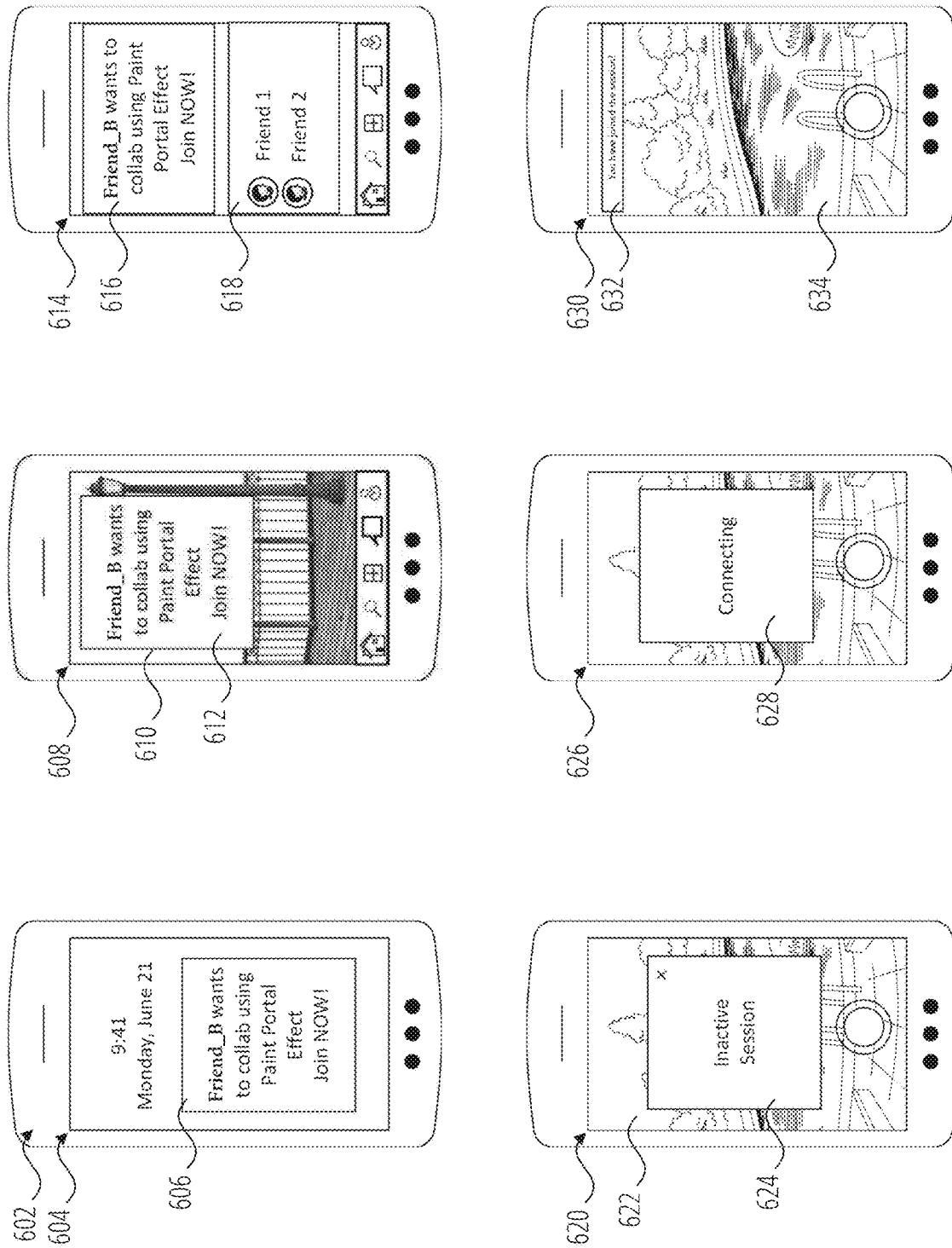
FIG. 6A depicts example user interfaces of a computing device in accordance with examples of the present disclosure.

FIGS. 6A-6B depict example user interfaces of a computing device in accordance with examples of the present disclosure. The various user interfaces presented in FIGS. 6A-6B depict an example of a shared augmented reality session. In examples, the user interfaces presented in FIGS. 6A-6B depict examples where such an augmented reality session can be used by more than one user and depict examples from a point of view of an invited user that joins a shared augmented reality session. A first user interface 604 is displayed at a computing device 602 in accordance with examples of the present disclosure. The computing device 602 may be the same as or similar to the computing device 202 previously described. The first user interface 604 may include a message 606 indicating that a friend (e.g., Friend_B) would like the current user to join a shared augmented reality session. The first user interface 604 may display the message 606 when the display (e.g., screen) of the computing device 602 is in a locked stated for example. Alternatively, or in addition, when the computing device 602 is in an unlocked state and a user may be using a video recording application, such as the video recording application depicted in first user interface 404 (FIG. 4A), a message 612 may be displayed over the background scene 610 as depicted in the second user interface 608. Alternatively, or in addition, a user viewing activity history may view a message 616 amongst other activity information 618, as depicted in the third user interface 614. The activity information may display recent activity information for one or more friends or contacts. Each of the message 606, message 612, and message 616 may be provided via a push notification, a SMS notification, or the like.

In some examples, when a user selects one of the messages, the user may automatically connect to the shared augmented reality session. However, in some instances, the shared augmented reality session may be expired. For example, as depicted in the fourth user interface 620, a message 624 displayed over the background scene 622 may indicate that the shared augmented reality session has expired. Accordingly, a user may request that the invitation be sent again.

In examples where the shared augmented reality session is not expired, the message 628 may be displayed to the user at the fifth user interface 626. Such a message 628 may be provided to keep the user informed as to a connection state of the application. In examples, once connected, a session message 632 may be provided to the user, as depicted in the sixth user interface 630. The session message 632 may indicate that the user has connected to a shared augmented reality session. The sixth user interface 630 may include a background scene 634 of a video. In examples, the background scene 634 may be presented or otherwise displayed in a manner similar to a view finder of a camera. That is, a camera of the computing device 602 that is associated with the display of the computing device 602 may acquire an image and display the image at the display. As the computing device 602, and thus the camera move, the background scene 634 may change. In addition, the sixth user interface 630 displays a record control. The record control may allow a user associated with the computing device 602 to record video together with one or more graphic effects that are created as the video is recorded, acquired, and/or as another video is played.

In examples, a user may select an effect control to bring up an effect pallet 638 as depicted in FIG. 6B. That is, as depicted in the seventh user interface 636, the effect pallet 638 includes a plurality of effect tools. For example, an effect tool may correspond to a drawing tool, a painting tool, and/or another tool that creates or causes a visual effect to be displayed at the user interface. A user may select an effect tool 640, such as a paintbrush, pen, pencil, etc. In examples, the user may create a current user visual effect 644, where the current user visual effect 644 depicts a graphic effect in process as created by the current user of the computing device 602. As further depicted in the seventh user interface 636, the computing device 602 may receive session/synchronization data that includes graphic effects from another user, e.g., Friend_A, in this case the user that invited the current user. Accordingly, the seventh user interface 636 may display the second user visual effect 646, where like the current user visual effect 644, the second user visual effect 646 is in an unfinished state. In examples, the video sequence record progress bar 642 may indicate that the user is recording video that at least includes the background scene together with the current user visual effect 644 and second user visual effect 646.

In examples, the background scene may change as a user moves the computing device 602. For example, the background scene 652 depicted in the eighth user interface 648 is different from the background scene 634. As further depicted in the eighth user interface 648, the second user visual effect 656 from another user, e.g., Friend_B, in this case the user that invited the current user of the computing device 502 and the current user visual effect 654 from the invited user of the computing device 602 are complete. In some examples, the video sequence record progress bar 650 may indicate that video recording has completed. At the conclusion of recording a video, a ninth user interface 658 may display an initial background scene together with the one or more user effects (e.g., second user visual effect 656, current user visual effect 654). A user may interact with the ninth user interface 658 to edit the captured video. For example, the user may add text, music, emojis, etc. to the newly captured video. A user may select a next control and proceed to the tenth user interface 660.

At the tenth user interface 660, a user may select one or more configurations associated with the newly acquired video. For example, the user may decide to allow comments, determine who can view the newly acquired video, and/or determine whether individuals can download the video. In some examples, the user may provide a caption 662 for the video, where the caption 662 may include text describing the video. The tenth user interface 660 may also display a video thumbnail associated with the newly acquired video. Upon selecting the post control 664, the newly acquired video can be posted to a video hosting platform, such as one hosted in the cloud processing environment. The newly acquired video may be displayed as depicted in the eleventh user interface 666.

FIG. 7 depicts an example data structure 702 in accordance with examples of the present disclosure. The data structure 702 may reside at the graphic object store 330 (FIG. 3) and may include a session identifier 704 that uniquely identifies a shared augmented reality session. In examples, to create and/or synchronize graphic object data used to create visual effects at local sessions associated with participants and computing devices, the data structure 702 may include a visual effect identifier 706, a time stamp 712, and a graphic object identifier 710. The graphic object identifier 710 may identify the graphic object (e.g., line, point, dot, shape, image, etc.) associated with a visual effect. In some examples, a visual effect may include a plurality of graphic objects. For example, a plurality of lines or dots may create a shape such as a square or circle; a visual effect identifier 706 may associate a graphic object identifier 710 with a visual effect. Accordingly, many graphic object identifiers 710 may be associated with a single visual effect identifier 706. In other examples, a graphic object identifier may identify a graphic object that is the same as a visual effect. Thus, only one graphic object identifier may be associated with a visual effect.

The data structure 702 may also include a user identifier 708 that identifies a user that created the visual effect identifier 706 and/or graphic object identifier 710. Accordingly, in instances where a user may exert additional control over which visual effects are displayed at a display device, the visual effects may be filtered according to the user that created the visual effect. For example, in instances where a user may choose to delete or clear all visual effects associated with a specific user, the user identifier 708 may be used to identify the specific user who created effects to be deleted or cleared. The time stamp 712 can be used to replay, backup, and/or edit the graphic object identifier 710 and/or visual effect identifier 706. In some examples, the time stamp 712 may be offset from a starting point, such as a beginning of a recording, or may be associated with a current or present time and date.

Figure 8:
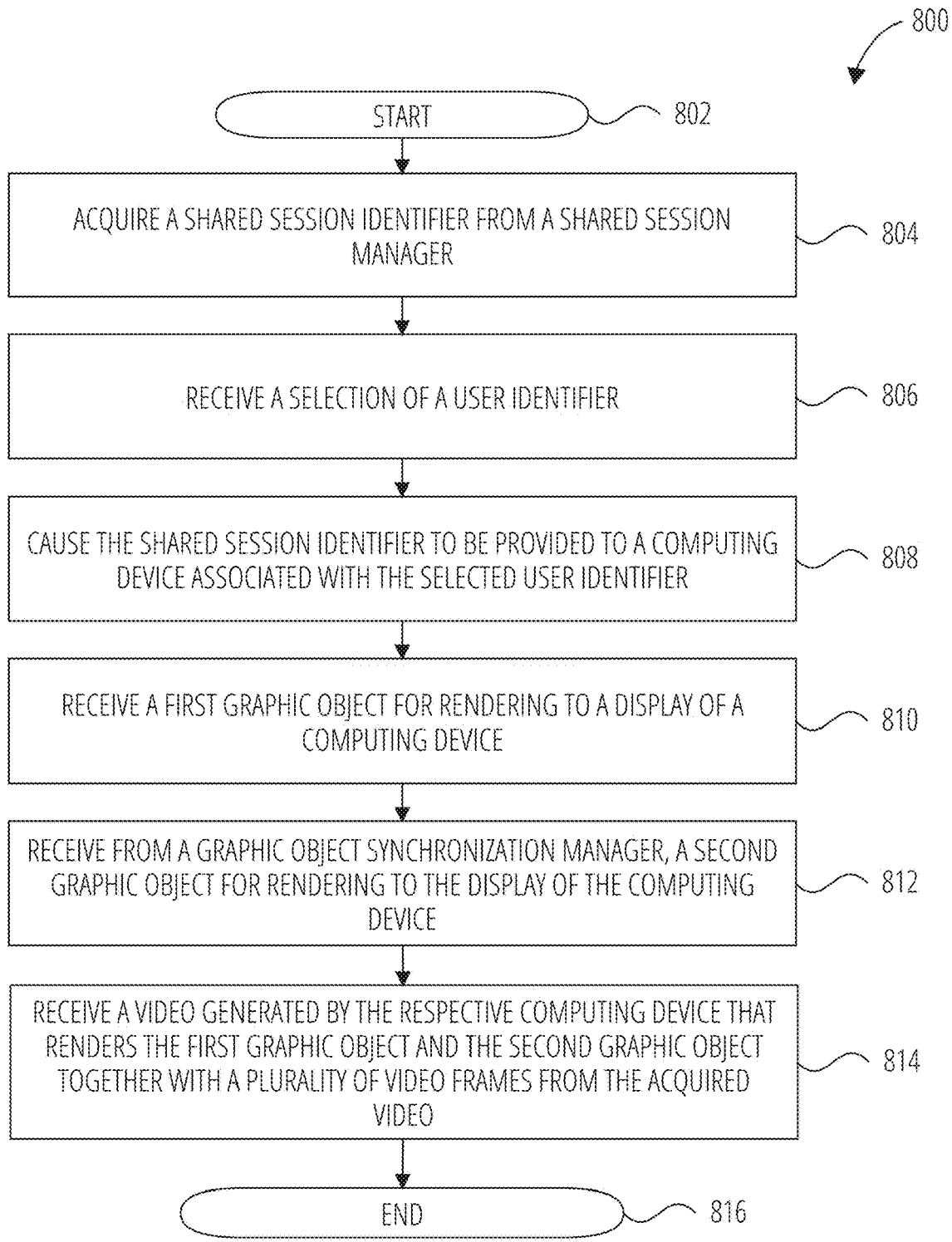
FIG. 8 depicts details of a method for generating a video including a plurality of graphic objects provided in a shared environment is described in accordance with examples of the present disclosure.

Referring now to FIG. 8, a simplified method 800 for generating a video including a plurality of graphic objects provided in a shared environment is described in accordance with examples of the present disclosure. A general order for the steps of a method 800 is shown in FIG. 8. Generally, the method 800 starts at 802 and ends at 816. The method 800 may include more or fewer steps or may arrange the order of the steps differently than those shown in FIG. 8. The method 800 can be executed as a set of computer-executable instructions executed by a computer system and encoded or stored on a computer readable medium. In an illustrative aspect, the method 800 is executed by a computing device associated with a first user (e.g., computing device 102) and or a server in a cloud processing environment (e.g., server 302). However, it should be appreciated that aspects of the method 800 may be performed by one or more processing devices, such as a computer or server (e.g., 102, 110, 202, 302, etc.). Further, the method 800 can be performed by gates or circuits associated with a processor, Application Specific Integrated Circuit (ASIC), a field programmable gate array (FPGA), a system on chip (SOC), a neural processing unit, or other hardware device. Hereinafter, the method 800 shall be explained with reference to the systems, components, modules, software, data structures, user interfaces, etc. described in conjunction with FIGS. 1-7.

The method 800 starts at 802 and proceeds to 804, where a shared session identifier may be acquired from a shared session manager. For example, a computing device 102 may request a shared augmented reality session identifier from a shared session manager 322 as shown in FIG. 3. In examples, the shared session manager 322 may provide the shared augmented reality session identifier to the local session manager 228 as shown in FIG. 2. In examples, the shared augmented reality session identifier is associated with a first user identifier, such as a first user that is currently using the computing device 102 that made a request for the shared augmented reality session identifier. The method 800 may proceed to 806, where a first user associated with the first user identifier may make a selection of another second user to invite to the shared augmented reality session. For example, an invite a friend interface, such as the invite a friend interface 522 may be presented to the first user. The first user may select a second user identifier associated with a friend or a contact.

As another example, a friends list that exists at the first computing device (e.g., computing device 102) or is otherwise accessible at the first computing device (e.g., computing device 102) may be associated with a first user identifier for a first user that uses the first computing device (e.g., computing device 102). Thus, a first user, desiring to setup a shared augmented reality session may cause one or more applications to access the contacts manager and present, for display to the first user, a list of friends or contacts to invite into the shared augmented reality session. The contacts manager 234 may include information to identify a contact by username, user identifier, etc. Accordingly, upon being selected, information associated with a friend or contact may be included in an invitation and can be sent to the cloud processing environment, where an invitation manager in the cloud processing environment may deliver the invitation to the invited friend or contact.

In examples, the method 800 may proceed to 808, where the shared augmented reality session identifier may be provided to a second computing device (e.g., computing device 110) associated with the selected second user of 806. Alternatively, or in addition, upon accepting an invitation, a shared session manager of the cloud processing environment may provide a shared augmented reality session identifier to the second computing device (e.g., computing device 110) such that a local session manager (e.g., local session manager 228 as shown in FIG. 2) of the first computing device (e.g., computing device 102) may generate a local session and associate the local session with the shared augmented reality session identifier. Alternatively, or in addition, the session/synchronization data (e.g., session/synchronization data 122) may include a shared augmented reality session identifier such that the local session manager of the first computing device (computing device 102) generates a local session and associates the local session with the shared augmented reality session identifier provided in the session/synchronization data or invitation.

The method 800 may proceed to 810, where at the second computing device (e.g., computing device 110), an indication that a first graphic object is to be rendered to a display of the computing device (e.g., computing device 110) is received. For example, a first user may start recording video while using an effect tool to draw or otherwise create a visual effect. Such visual effect may include a plurality of graphic objects. At 812, a first graphic object may be received from the cloud processing environment as session/synchronization data. Accordingly, the first graphic object data created by another local session, or first computing device associated with the local session, may be provided to a data synchronizer in a cloud processing environment. The data synchronizer in the cloud processing environment may provide session/synchronization data to the effect sync manager in one or more of the computing devices 102/110. The video effects generator may utilize the first graphic object data from the data synchronizer in the cloud processing environment as well as second graphic object data from the effect manager to generate a visual effect 114 for example. The visual effect 114 may include first and second graphic objects from the first computing device (e.g., computing device 102) as well as from a second computing device (e.g., computing device 110). In examples, at 814, a final video may be generated by the respective computing device by rendering the first graphic object and the second graphic object together with a plurality of video frames from the acquired video. For example, a video effects generator may generate rendered video frames and store the rendered video frames as output. In examples, the rendered video frames may be posted to a video hosting platform for viewing by other users. The method 800 may end at 816.

Figure 9:
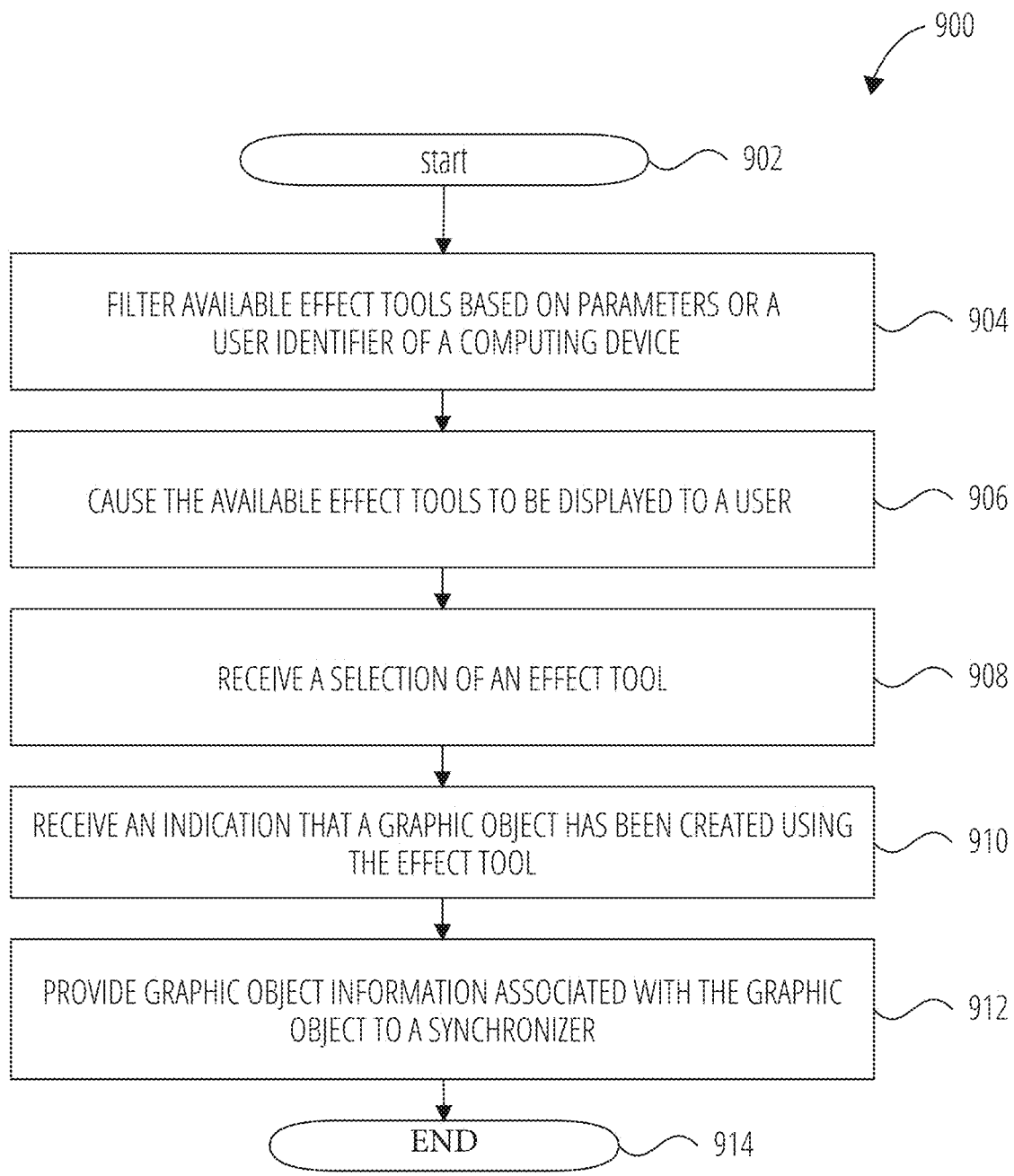
FIG. 9 depicts details of a method for receiving a graphic object and providing the graphic object to synchronizer of a shared environment is described in accordance with examples of the present disclosure.

Referring now to FIG. 9, a simplified method 900 for receiving a first graphic object and providing the first graphic object to synchronizer of a shared environment is described in accordance with examples of the present disclosure. A general order for the steps of a method 900 is shown in FIG. 9. Generally, the method 900 starts at 902 and ends at 916. The method 900 may include more or fewer steps or may arrange the order of the steps differently than those shown in FIG. 9. The method 900 can be executed as a set of computer-executable instructions executed by a computer system and encoded or stored on a computer readable medium. In an illustrative aspect, the method 900 is executed by a first computing device associated with a first user (e.g., computing device 102) and or a server in a cloud processing environment (e.g., server 302). However, it should be appreciated that aspects of the method 900 may be performed by one or more processing devices, such as a computer or server (e.g., 102, 110, 202, 302, etc.). Further, the method 900 can be performed by gates or circuits associated with a processor, Application Specific Integrated Circuit (ASIC), a field programmable gate array (FPGA), a system on chip (SOC), a neural processing unit, or other hardware device. Hereinafter, the method 900 shall be explained with reference to the systems, components, modules, software, data structures, user interfaces, etc. described in conjunction with FIGS. 1-8.

The method 900 starts at 902 and proceeds to 904, where a plurality of effect tools may be filtered based on a parameter associated with a first computing device and/or first user identifier. For example, as previously described, the color, width, and other effects may be changed to obtain different graphic objects. In some examples, the availability of a graphic object, such as a paintbrush, attribute of the paintbrush, or specific paintbrush type, may be controlled or otherwise enabled according to one or more parameters. Accordingly, those effect tools available to a user may be filtered at 904 and then displayed to a first user at 906.

At 908, an indication associated with a selection of an effect tool may be received. For example, a first user may select a paintbrush tool. At 910, an indication that a first user is creating a first graphic object with the selected effect tool may be received. For example, the first user may start creating a first graphic object; such initiating may be received as an indication at 910. The method 900 may proceed to 912 such that first graphic objection information, or data, associated with the first graphic object can be provided to a data synchronizer. In examples, a first computing device may transmit the first graphic objection information as session/synchronization data to the data synchronizer of the server. Accordingly, the data synchronizer can synchronize the first graphic object with other computing devices. The method 900 may end at 914.

Figure 10:
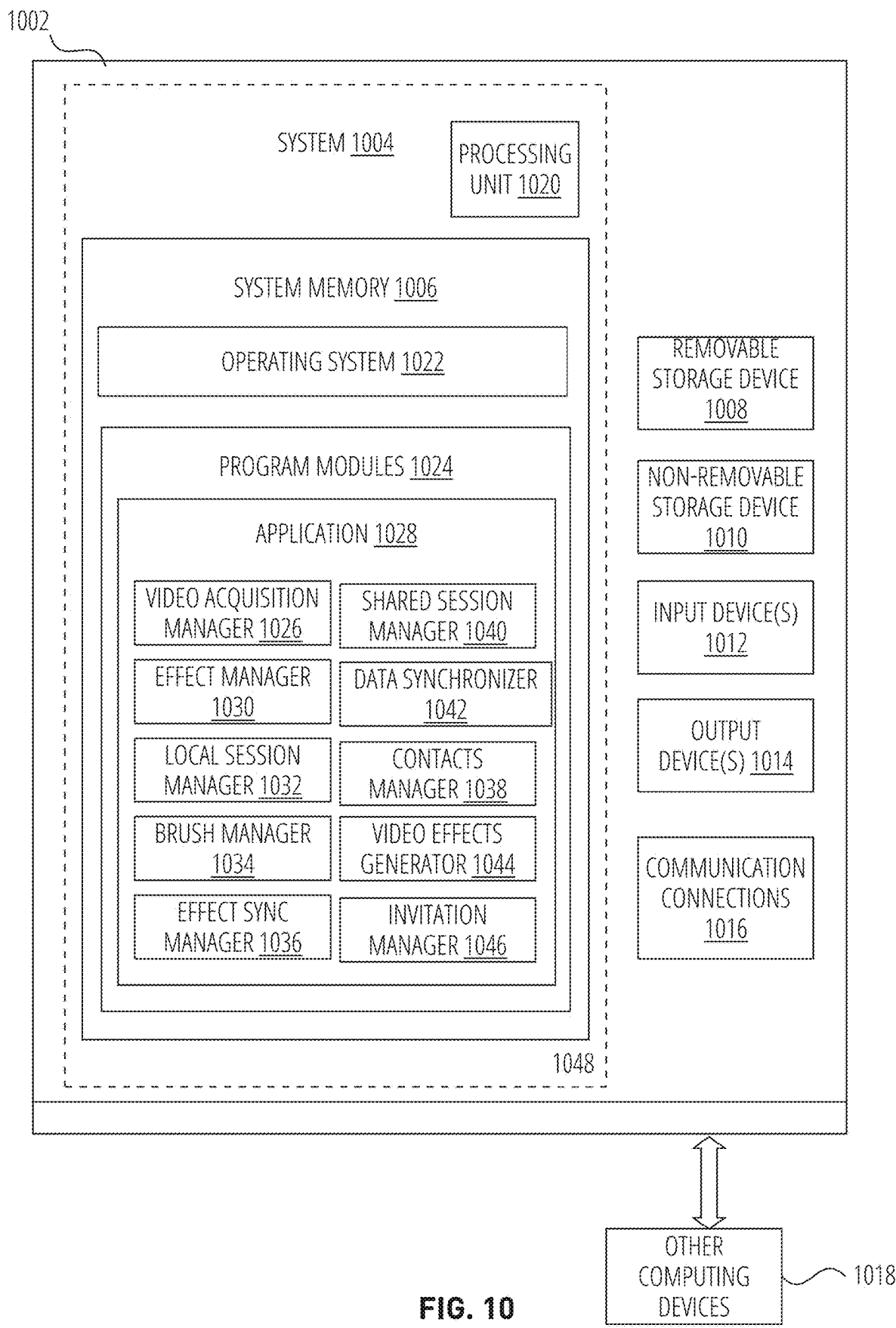
FIG. 10 depicts a block diagram illustrating physical components (e.g., hardware) of a computing system with which aspects of the disclosure may be practiced.

FIG. 10 is a block diagram illustrating physical components (e.g., hardware) of a computing system 1002 with which aspects of the disclosure may be practiced. The computing system 1002 components described below may be suitable for the computing and/or processing devices described above. In a basic configuration, the computing system 1002 may include system components 1004 which may include at least one processing unit 1020 and a system memory 1006. Depending on the configuration and type of computing system, the system memory 1006 may comprise, but is not limited to, volatile storage (e.g., random-access memory (RAM)), nonvolatile storage (e.g., read-only memory (ROM)), flash memory, or any combination of such memories.

The system memory 1006 may include an operating system 1022 and one or more program modules 1024 suitable for running software application 1028, such as one or more components supported by the systems described herein. As examples, system memory 1006 may include the video acquisition manager 1026, the effect manager 1030, the local session manager 1032, the brush manager 1034, the effect sync manager 1036, the video effects generator 1044, the shared session manager 1040, the data synchronizer 1042, the contacts manager 1038, and the invitation manager 1046. The video acquisition manager 1026 may be the same as or similar to the video acquisition manager 224 previously described. The effect manager 1030 may be the same as or similar to the effect manager 226 previously described. The local session manager 1032 may be the same as or similar to the local session manager 228 as previously described. The brush manager 1034 may be the same as or similar to the component manager 230 previously described. The effect sync manager 1036 may be the same as or similar to the effect sync manager 232 previously described. The shared session manager 1040 may be the same as or similar to the shared session manager 322 previously described. The data synchronizer 1042 may be the same as or similar to the data synchronizer 324 previously described. The video effects generator 1044 may be the same as or similar to the video effects generator 236 previously described. The invitation manager 1046 may be the same as or similar to the invitation manager 328 previously described. The operating system 1022, for example, may be suitable for controlling the operation of the computing system 1002.

Furthermore, examples of the disclosure may be practiced in conjunction with a graphics library, other operating systems, or any other application program and are not limited to any particular application or system. This basic configuration of the computing system 1002 is illustrated in FIG. 10 by those components within an item 1048. The computing system 1002 may have additional features or functionality. For example, the computing system 1002 may also include additional data storage devices (removable and/or non-removable) such as magnetic disks, optical disks, or tape. Such additional storage is illustrated in FIG. 10 by a removable storage device 1008 and a non-removable storage device 1010.

As stated above, a number of program modules and data files may be stored in the shared augmented reality system 100. While executing on the processing unit 1020, the program modules 1024 (e.g., software applications 1030) may perform processes including, but not limited to, the aspects as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, examples of the disclosure may be practiced in an electrical circuit, discrete electronic elements, packaged or integrated electronic chips containing logic gates, a circuit utilizing a microprocessor, or on a single chip containing electronic elements or microprocessors. For example, some instances of the disclosure may be practiced via a system-on-a-chip (SOC) where each or many of the components illustrated in FIG. 10 may be integrated onto a single integrated circuit. Such a SOC device may include one or more processing units, graphics units, communications units, system virtualization units, and various application functionality, all of which are integrated (or "burned") onto the chip substrate as a single integrated circuit. When operating via a SOC, the functionality described herein, with respect to the capability of the client to switch protocols, may be operated via application-specific logic integrated with other components of the computing system 1002 on the single integrated circuit (chip). Examples of the disclosure may also be practiced using other technologies capable of performing logical operations such as, for example, AND, OR, and NOT, including but not limited to mechanical, optical, fluidic, and quantum technologies. In addition, examples of the disclosure may be practiced within a general-purpose computer or in any other circuits or systems.

The computing system 1002 may also have one or more input device(s) 1012 such as a keyboard, a mouse, a pen, a sound or voice input device, a touch or swipe input device, etc. The output device(s) 1014, such as a display, speakers, a printer, etc., may also be included. The aforementioned devices are examples, and others may be used. The computing system 1002 may include one or more communication connections 1016, allowing communications with other other computing devices 1018. Examples of suitable communication connections 1016 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable, and non-removable media implemented in any method or technology for storage of information, such as computer-readable instructions, data structures, or program modules. The system memory 1006, the removable storage device 1008, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage, or other magnetic storage devices, or any other article of manufacture which can be used to store information, and which can be accessed by the computing system 1002. Any such computer storage media may be part of the computing system 1002. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
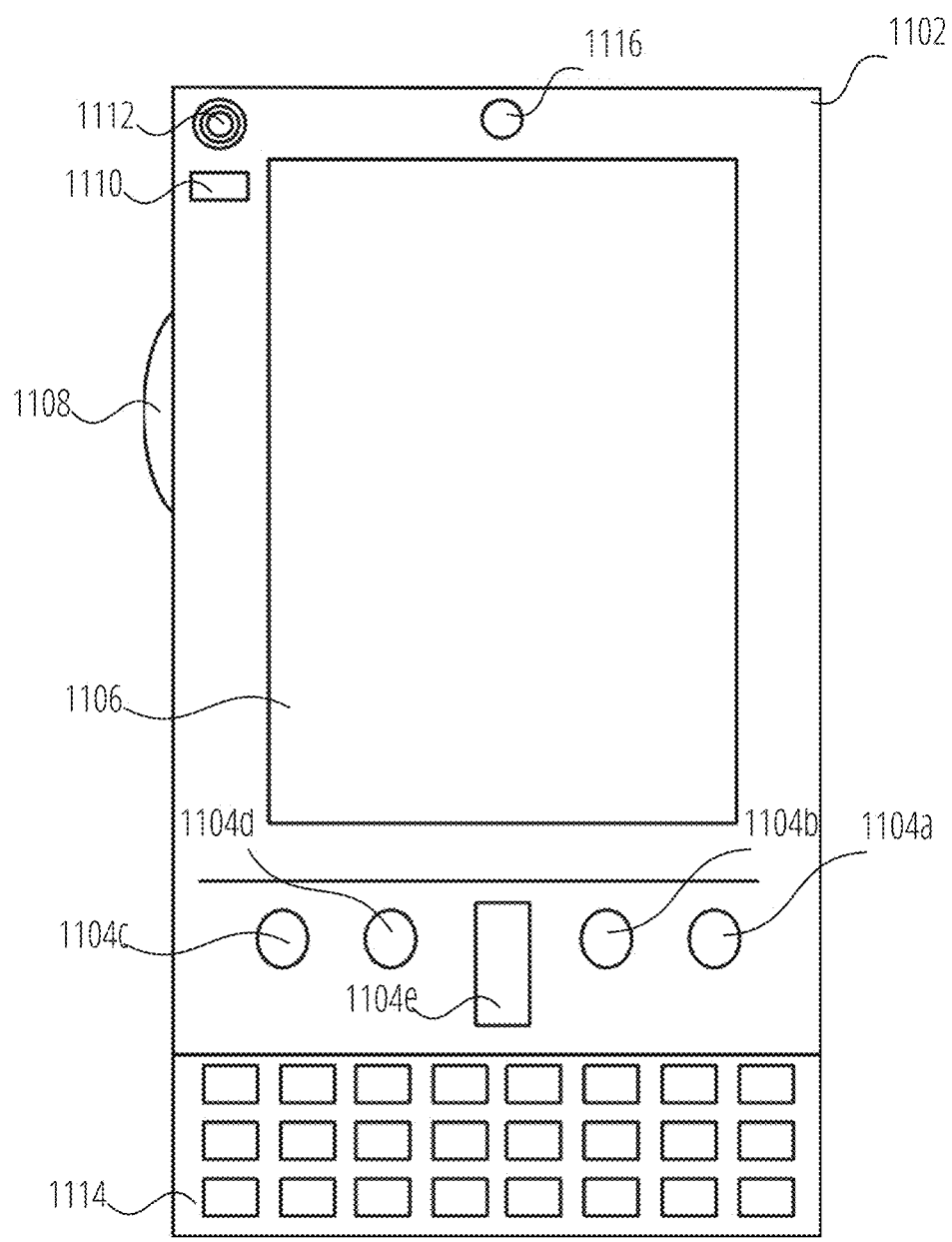
FIG. 11A depicts details of a computing system with which examples of the disclosure may be practiced.
Figure 11B:
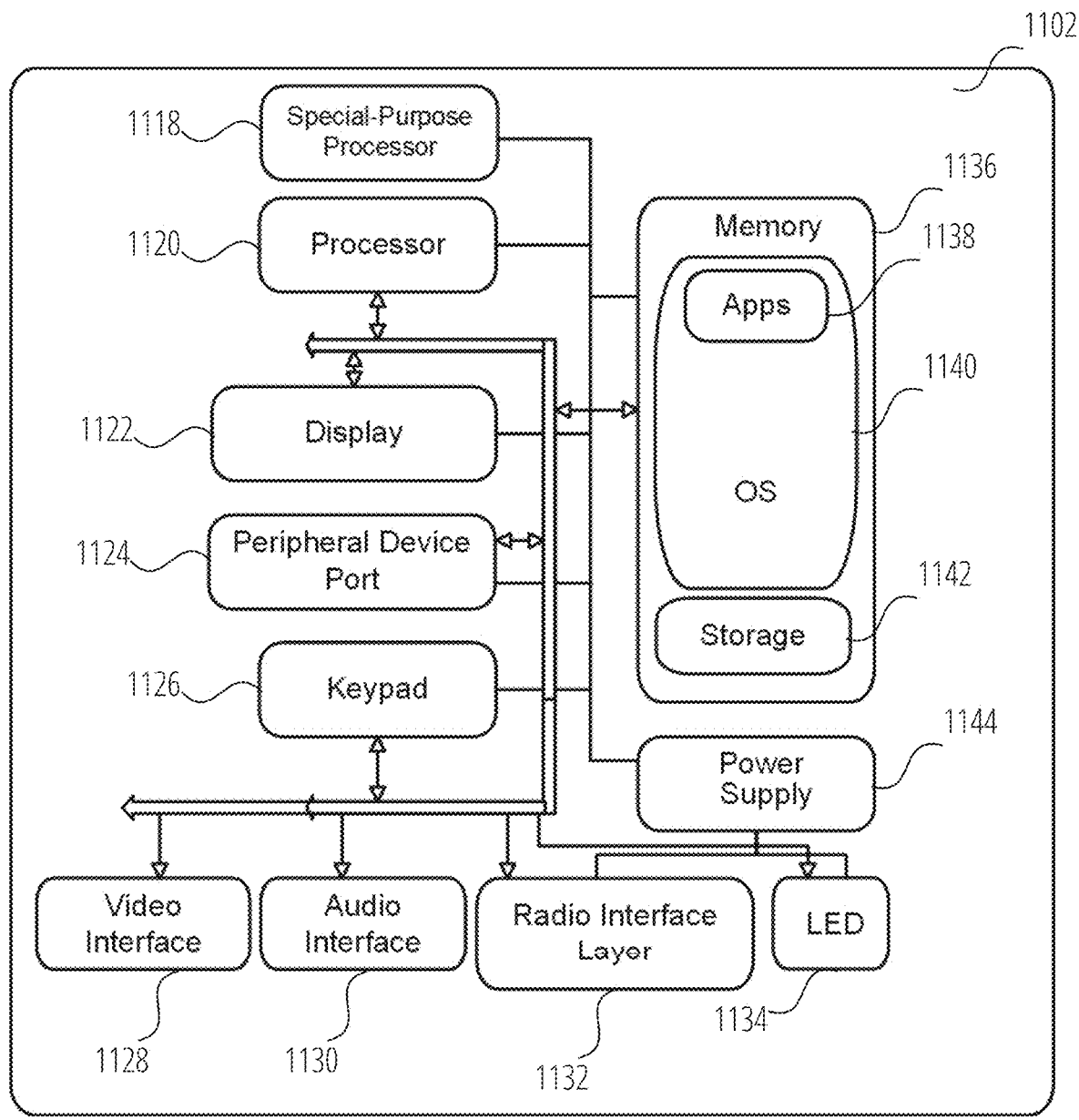
FIG. 11B depicts details of a computing system with which examples of the disclosure may be practiced.

FIG. 11A and FIG. 11B illustrate a computing system 1102, for example, a mobile telephone, a smart phone, wearable computer (such as a smart watch), a tablet computer, a desktop computer, a laptop computer, and the like, with which examples of the disclosure may be practiced. With reference to FIG. 11A, one aspect of a computing system 1102 for implementing the aspects is illustrated. In a basic configuration, the computing system 1102 is a desktop computer having both input elements and output elements. The computing system 1102 typically includes a display 1106/1122, which may also function as an input device (e.g., a touch screen display). The computing system 1102 may also include a keypad 1114/1126. The 1114 may be a physical keypad or a "soft" keypad generated on the touch screen display. Other keys or buttons 1104a-1104e may be provided for interacting with the system 1102.

In various examples, the output elements include the display 1106 for showing a graphical user interface (GUI), a visual indicator 1110 (e.g., a light-emitting diode 1134), and/or an audio transducer 1112 (e.g., a speaker). In yet another aspect, the computing system 1102 incorporates an audio interface 1130 such as input and/or output ports, including, as an example, an audio input (e.g., a microphone jack), an audio output (e.g., a headphone jack), and/or a video output (e.g., an HDMI port) for sending signals to or receiving signals from an external device.

FIG. 11B is a block diagram illustrating the architecture of one aspect of a mobile computing system. That is, the computing system 1102 can incorporate a system (e.g., an architecture) 1102 to implement some aspects. In some examples, the system 1102 is implemented as a "computing system" capable of running one or more applications (e.g., browser, e-mail, calendaring, contact managers, messaging clients, games, and media clients/players). In some aspects, system 1102 is integrated as a computing system, such as a desktop computer.

One or more application programs 1138 may be loaded into the 1136 and run on or in association with the operating system 1140. Examples of the application programs include phone dialer programs, e-mail programs, personal information management (PIM) programs, word processing programs, spreadsheet programs, Internet browser programs, messaging programs, maps programs, video platforms, video composition applications, and so forth. System 1102 also includes a nonvolatile storage area 1142 within the memory 1136. The nonvolatile storage area 1142 may be used to store persistent information that should not be lost if the system 1402 is powered down. The application programs 1138 may use and store information in the nonvolatile storage area 1142, such as e-mail or other messages used by an e-mail application, and the like. A synchronization application (not shown) also resides on system 1102 and is programmed to interact with a corresponding synchronization application resident on a host computer to keep the information stored in the nonvolatile storage area 1142 synchronized with corresponding information stored at the host computer. As should be appreciated, other applications may be loaded into the memory 1142 and run on the computing system 1102 described herein.

The system 1102 has a power supply 1144, which may be implemented as one or more batteries. The power supply 1144 might further include an external power source, such as an AC adapter or a powered docking cradle that supplements or recharges the batteries.

The system 1102 may also include a radio interface layer 1132 that performs the function of transmitting and receiving radio frequency communications. The radio interface layer 1132 facilitates wireless connectivity between the system 1402 and the "outside world" via a communications carrier or service provider. Transmissions to and from the radio interface layer 1132 are conducted under the control of the operating system 1140. In other words, communications received by the radio interface layer 1132 may be disseminated to the application programs 1138 via the operating system 1140 and vice versa.

The system 1102 may further include a video interface 1128 that enables an operation of an on-board camera via a peripheral port 1124 to record still images, video stream, and the like. A computing system 1102 may have additional features or functionality. For example, the computing system 1102 may also include additional data storage devices (removable and/or non-removable) such as magnetic disks, optical disks, or tape. Such additional storage is illustrated in FIG. 11B by the nonvolatile storage area 1142. The system 1102 may include a processor 1120 and/or a special-purpose processor 1118.

Data/information generated or captured by the computing system 1102 and stored via the system may be stored locally on the computing system 1102, as described above, or the data may be stored on any number of storage media that may be accessed by the device via the radio interface layer 1132 or via a wired connection between the computing system 1102 and a separate computing system associated with the computing system 1102, for example, a server computer in a distributed computing network, such as the Internet. As should be appreciated, such data/information may be accessed via the computing system 1102 via the radio interface layer 1132 or via a distributed computing network. Similarly, such data/information may be readily transferred between computing systems for storage and use according to well-known data/information transfer and storage means, including electronic mail and collaborative data/information sharing systems.

Figure 12:
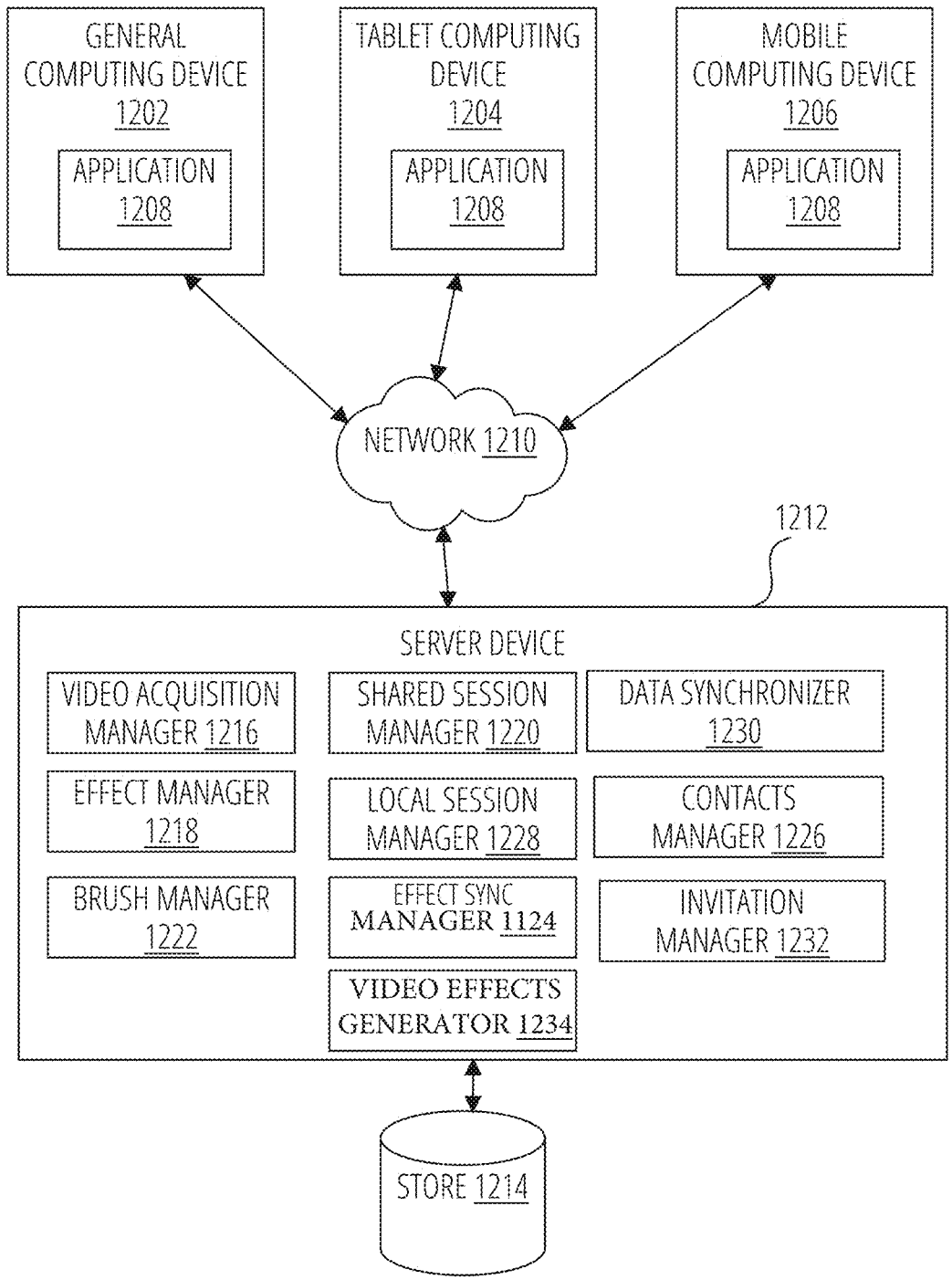
FIG. 12 depicts an architecture of a system for processing data received at a computing system in accordance with examples of the present disclosure.

FIG. 12 illustrates one aspect of the architecture of a system for processing data received at a computing system from a remote source, such as a general computing device 1202, a tablet computing device 1204, or mobile computing device 1206, as described above. Content at a server device 1212 may be stored in different communication channels or other storage types.

One or more of the previously described program modules 1024 or software applications 1028 may be employed by the server device 1212 and/or the general computing device 1202, a tablet computing device 1204, or mobile computing device 1206 as described above. For example, the server device 1212 may include the the video acquisition manager 1216, the effect manager 1218, the local session manager 1228, the brush manager 1222, the effect sync manager 1224, the video effects generator 1234, the shared session manager 1220, the data synchronizer 1230, the contacts manager 1226, and the invitation manager 1232. The video acquisition manager 1216 may be the same as or similar to the video acquisition manager 224 previously described. The effect manager 1218 may be the same as or similar to the effect manager 226 previously described. The local session manager 1228 may be the same as or similar to the local session manager 228 as previously described. The brush manager 1222 may be the same as or similar to the component manager 230 previously described. The effect sync manager 1224 may be the same as or similar to the effect sync manager 232 previously described. The shared session manager 1220 may be the same as or similar to the shared session manager 322 previously described. The data synchronizers 1230 may be the same as or similar to the data synchronizer 324 previously described. The video effects generator 1234 may be the same as or similar to the video effects generator 236 previously described. The invitation manager 1232 may be the same as or similar to the invitation manager 328 previously described.

The server device 1212 may provide data to and from a client computing device such as a general computing device 1202, a tablet computing device 1204, and/or a mobile computing device 1206 (e.g., a smart phone) through a network 1210. By way of example, the computer system described above may be embodied in a general computing device 1202, a tablet computing device 1204, and/or an application 1208 (e.g., a smart phone). Any of these examples of the computing devices may obtain content from the store 1214, in addition to receiving graphical data useable to be either pre-processed at a graphic-originating system or post-processed at a receiving computing system.

In addition, the aspects and functionalities described herein may operate over distributed systems (e.g., cloud-based computing systems), where application functionality, memory, data storage, and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which examples of the invention may be practiced includes keystroke entry, touch screen entry, voice or other audio entry, gesture entry where an associated computing device is equipped with detection (e.g., the camera 1116) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of order, as shown in any flowchart. For example, two blocks shown in succession may, in fact, be executed substantially concurrently, or the blocks may sometimes be executed in the reverse order, depending upon the functionality/acts involved.

The present disclosure relates to systems and methods for a shared augmented reality system that allows a first user, or participant, and a second user, or second participant, to together add one or more visual effects to respective videos according to at least the examples provided in the sections below:

(A1) In one aspect, some examples include a method. The method may include: acquiring, at a first computing device associated with a first user identifier, a shared session identifier from a shared session manager, the shared session identifier being associated with the first user identifier, receiving a selection of a second user identifier, causing the shared session identifier and the first user identifier to be provided to a second computing device associated with the second user identifier, receiving as input, a first graphic object for rendering to a display of the first computing device, the first graphic object being associated with the first user identifier, receiving from a data synchronizer, a second graphic object associated with the second user identifier and the shared session identifier for rendering to the display of the first computing device and generating a video including a plurality of graphic objects by rendering the first graphic object and the second graphic object together with a plurality of video frames of the video.

(A2) In some examples of A1, acquiring the shared session identifier from the shared session manager comprises: transmitting a request for a new shared session identifier to a shared session manager, and receiving the shared session identifier from the shared session manager.

(A3) In some examples of A1-A2, the method further includes: providing the first graphic object associated with the first user identifier and the shared session identifier to the data synchronizer.

(A4) In some examples of A1-A3, the data synchronizer and the shared session manager are located at a device other than the first computing device.

(A5) In some examples of A1-A4, the method further includes: acquiring video using at least one camera of the first computing device; while acquiring the video: receiving as input, the first graphic object for rendering to the display of the computing device; receiving from the data synchronizer, the second graphic object associated with the second user identifier for rendering to the display of the first computing device; and generating the video by rendering the first graphic object and the second graphic object together with a plurality of video frames from the acquired video.

(A6) In some examples of A1-A5, the method further includes: while acquiring the video, providing the first graphic object associated with the first user identifier and the shared session identifier to the data synchronizer.

(A7) In some examples of A1-A6, the first graphic object is associated with a first drawing effect and the second graphic object is associated with a second drawing effect.

(A8) In some examples of A1-A7, the first drawing effect is different from the second drawing effect.

(A9) In some examples of A1-A8, the method further includes: causing a graphic element including information associated with the second user identifier to be displayed at the display associated with the first computing device.

(A10) In some examples of A1-A9, the method further includes: receiving a selection of a third user identifier; causing the shared session identifier and the first user identifier associated with the first computing device to be provided to a third computing device associated with the third user identifier; receiving from the data synchronizer, a third graphic object associated with the third user identifier for rendering to the display of the first computing device; and generating the video by rendering the first graphic object, the second object, and the third graphic object together with a plurality of video frames of the video.

In yet another aspect, some examples include a computing system including one or more processors and memory coupled to the one or more processors, the memory storing one or more instructions which when executed by the one or more processors, causes the one or more processors perform any of the methods described herein (e.g., A1-A10 described above).

In yet another aspect, some examples include a non-transitory computer-readable storage medium storing one or more programs for execution by one or more processors of a storage device, the one or more programs including instructions for performing any of the methods described herein (e.g., A1-A10 described above).

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate aspects falling within the spirit of the broader aspects of the general inventive concept embodied in this application that does not depart from the broader scope of the claimed disclosure.

What is claimed is:

1. A method of generating a video including a plurality of graphic objects provided in a shared environment, the method comprising:
   acquiring, at a first computing device associated with a first user identifier, a shared session identifier from a shared session manager, the shared session identifier being associated with the first user identifier;
   receiving a selection of a second user identifier;
   causing the shared session identifier and the first user identifier to be provided to a second computing device associated with the second user identifier;
   receiving as input, a first graphic object for rendering to a display of the first computing device, the first graphic object being associated with the first user identifier;
   receiving from a data synchronizer, a second graphic object associated with the second user identifier and the shared session identifier for rendering to the display of the first computing device; and
   generating a video including a plurality of graphic objects by rendering the first graphic object and the second graphic object together with a plurality of video frames of the video.

2. The method of claim 1, wherein acquiring the shared session identifier from the shared session manager comprises:
   transmitting a request for a new shared session identifier to a shared session manager; and
   receiving the shared session identifier from the shared session manager.

3. The method of claim 1, further comprising:
   providing the first graphic object associated with the first user identifier and the shared session identifier to the data synchronizer.

4. The method of claim 3, wherein the data synchronizer and the shared session manager are located at a device other than the first computing device.

5. The method of claim 1, further comprising:
   acquiring video using at least one camera of the first computing device;
   while acquiring the video:
      receiving as input, the first graphic object for rendering to the display of the computing device;
      receiving from the data synchronizer, the second graphic object associated with the second user identifier for rendering to the display of the first computing device; and
      generating the video by rendering the first graphic object and the second graphic object together with a plurality of video frames from the acquired video.

6. The method of claim 5, further comprising:
   while acquiring the video, providing the first graphic object associated with the first user identifier and the shared session identifier to the data synchronizer.

7. The method of claim 1, wherein the first graphic object is associated with a first drawing effect and the second graphic object is associated with a second drawing effect.

8. The method of claim 7, wherein the first drawing effect is different from the second drawing effect.

9. The method of claim 7, further comprising:
   causing a graphic element including information associated with the second user identifier to be displayed at the display associated with the first computing device.

10. The method of claim 1, further comprising:
    receiving a selection of a third user identifier;
    causing the shared session identifier and the first user identifier associated with the first computing device to be provided to a third computing device associated with the third user identifier;
    receiving from the data synchronizer, a third graphic object associated with the third user identifier for rendering to the display of the first computing device; and
    generating the video by rendering the first graphic object, the second object, and the third graphic object together with a plurality of video frames of the video.

11. A computing device comprising:
    a processor; and
    a memory storing instructions that, when executed by the processor, configure the computing device to:
       acquire a shared session identifier from a shared session manager, the shared session identifier being associated with a first user identifier;
       receive a selection of a second user identifier;

cause the shared session identifier and the first user identifier to be provided to a shared augmented reality session processor;

receive as input, a first graphic object for rendering to a display associated with the computing device, the first graphic object being associated with the first user identifier;

receive from a data synchronizer, a second graphic object associated with the second user identifier and the shared session identifier for rendering to the display associated with the computing device; and generate a video including a plurality of graphic objects by rendering the first graphic object and the second graphic object together with a plurality of video frames of the video.

12. The computing device of claim 11, wherein acquiring the shared session identifier from the shared session manager comprises:

transmitting a request for a new shared session identifier to a shared session manager; and receiving the shared session identifier from the shared session manager.

13. The computing device of claim 11, wherein the instructions further configure the computing device to:

provide the first graphic object associated with the first user identifier and the shared session identifier to the data synchronizer.

14. The computing device of claim 13, wherein the data synchronizer and the shared session manager are located at a device other than the computing device.

15. The computing device of claim 11, wherein the instructions further configure the computing device to:

acquire video using at least one camera of the computing device;

while acquiring the video:

receive as input, the first graphic object for rendering to the display associated with the computing device;

receive from the data synchronizer, the second graphic object associated with the second user identifier for rendering to the display associated with the computing device; and generate the video by rendering the first graphic object and the second graphic object together with a plurality of video frames from the acquired video.

16. A non-transitory computer-readable storage medium, the computer-readable storage medium including instructions that when executed by a first computing device, cause the first computing device to:

acquire a shared session identifier from a shared session manager, the shared session identifier being associated with a first user identifier;

receive a selection of a second user identifier;

cause the shared session identifier and the first user identifier to be provided to a second computing device associated with the second user identifier;

receive as input, a first graphic object for rendering to a display associated with the first computing device, the first graphic object being associated with the first user identifier;

receive from a data synchronizer, a second graphic object associated with the second user identifier and the shared session identifier for rendering to the display associated with the first computing device; and generate a video including a plurality of graphic objects by rendering the first graphic object and the second graphic object together with a plurality of video frames of the video.

17. The computer-readable storage medium of claim 16, wherein acquiring the shared session identifier from the shared session manager comprises:

transmitting a request for a new shared session identifier to a shared session manager; and receiving the shared session identifier from the shared session manager.

18. The computer-readable storage medium of claim 16, wherein the instructions further configure the first computing device to:

provide the first graphic object associated with the first user identifier and the shared session identifier to the data synchronizer.

19. The computer-readable storage medium of claim 18, wherein the data synchronizer and the shared session manager are located at a device other than the first computing device.

20. The computer-readable storage medium of claim 16, wherein the instructions further configure the first computing device to:

acquire video using at least one camera of the first computing device;

while acquiring the video:

receive as input, the first graphic object for rendering to the display associated with the first computing device;

receive from the data synchronizer, the second graphic object associated with the second user identifier for rendering to the display associated with the first computing device; and generate the video by rendering the first graphic object and the second graphic object together with a plurality of video frames from the acquired video.

* * * * *